(12) United States Patent
Murata

(10) Patent No.: US 9,971,493 B2
(45) Date of Patent: May 15, 2018

(54) INFORMATION PROCESSING DEVICE AND DISPLAY CONTROL METHOD

(71) Applicant: Jun Murata, Tokyo (JP)

(72) Inventor: Jun Murata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 212 days.

(21) Appl. No.: 14/266,106

(22) Filed: Apr. 30, 2014

(65) Prior Publication Data

US 2014/0333528 A1    Nov. 13, 2014

(30) Foreign Application Priority Data

May 7, 2013    (JP) .................... 2013-097849

(51) Int. Cl.
G06F 3/0485    (2013.01)

(52) U.S. Cl.
CPC ............ G06F 3/04855 (2013.01); *G06F 2203/04803* (2013.01)

(58) Field of Classification Search
CPC ...................................................... H04N 7/155
See application file for complete search history.

(56) References Cited

U.S. PATENT DOCUMENTS

| | | | | |
|---|---|---|---|---|
| 7,564,377 B2* | 7/2009 | Kimchi | ............... | G01C 21/26 340/905 |
| 7,716,194 B2 | 5/2010 | Williams et al. | | |
| 2007/0161382 A1* | 7/2007 | Melinger | ............... | H04L 67/18 455/456.1 |
| 2008/0133600 A1 | 6/2008 | Uehori et al. | | |
| 2011/0029893 A1* | 2/2011 | Roberts et al. | ............... | 715/753 |
| 2012/0050197 A1* | 3/2012 | Kemmochi | ............... | 345/173 |

FOREIGN PATENT DOCUMENTS

| | | |
|---|---|---|
| JP | 08-194492 | 7/1996 |
| JP | 2001051987 A | 2/2001 |
| JP | 2004206658 A | 7/2004 |

(Continued)

OTHER PUBLICATIONS

Japanese Office Action dated Jan. 31, 2017 for corresponding Japanese Patent Application No. 2013-097849.

*Primary Examiner* — Amare Mengistu
*Assistant Examiner* — Shawna Stepp Jones
(74) *Attorney, Agent, or Firm* — Harness, Dickey & Pierce, P.L.C.

(57) ABSTRACT

An information processing device includes: an operation unit to receive a user's operation; a first communication unit to perform communication with an external device; a first content acquisition unit to acquire first content generated in response to the user's operation; a second content acquisition unit to acquire second content received from the external device; a content storage unit to store the first and second content in association with their respective acquisition times; a display; and a display control unit. The display control unit causes the display to: display a time axis as well as first and second display regions; display the first content at a position on the time axis indicating the time associated with the first content in the first display region; and displays the second content at a position on the time axis indicating the time associated with the second content in the second display region.

18 Claims, 31 Drawing Sheets

(56) References Cited

FOREIGN PATENT DOCUMENTS

| JP | 2006-113886 | 4/2006 |
| JP | 2006-146415 | 6/2006 |
| JP | 2008-172582 | 7/2008 |
| JP | 2012003778 A | 1/2012 |
| JP | 5003125 | 6/2012 |
| JP | 2012173890 A | 9/2012 |
| JP | 2013-011744 | 1/2013 |

* cited by examiner

FIG.5A

| EVENT TABLE |
|---|
| CREATOR |
| END TIME |
| EVENT ID |
| MEETING ID |
| NOTE INFORMATION |
| START TIME |
| TITLE |
| IDENTIFICATION INFORMATION |

FIG.5B

| GPS TRACE TABLE |
|---|
| CAPTURE TIME |
| CREATOR |
| LATEST CAPTURE TIME |
| LATITUDE |
| LONGITUDE |
| MEETING ID |
| IDENTIFICATION INFORMATION |

FIG.5C

| PAPERLESS CONFERENCE SYSTEM TABLE |
|---|
| END TIME |
| MEETING ID |
| NAME |
| PASS CODE |
| PAPERLESS CONFERENCE SYSTEM ID |
| START TIME |
| IDENTIFICATION INFORMATION |

FIG.5D

| CAPTURE TABLE |
|---|
| CREATOR |
| LATITUDE |
| LONGITUDE |
| MEETING ID |
| TIME |
| URL |
| IDENTIFICATION INFORMATION |

FIG.5E

| SOUND TABLE |
|---|
| CREATOR |
| END TIME |
| MEETING ID |
| START TIME |
| URL |
| IDENTIFICATION INFORMATION |

FIG.5F

| MEMO TABLE |
|---|
| CREATOR |
| INDEX |
| LATITUDE |
| LONGITUDE |
| MEETING ID |
| MEMO CONTENT |
| TIME |
| IDENTIFICATION INFORMATION |

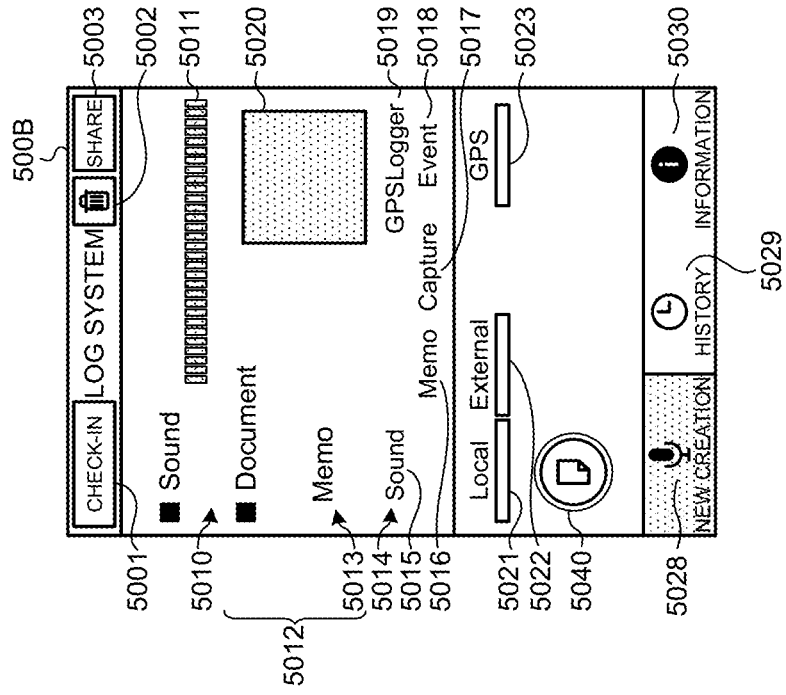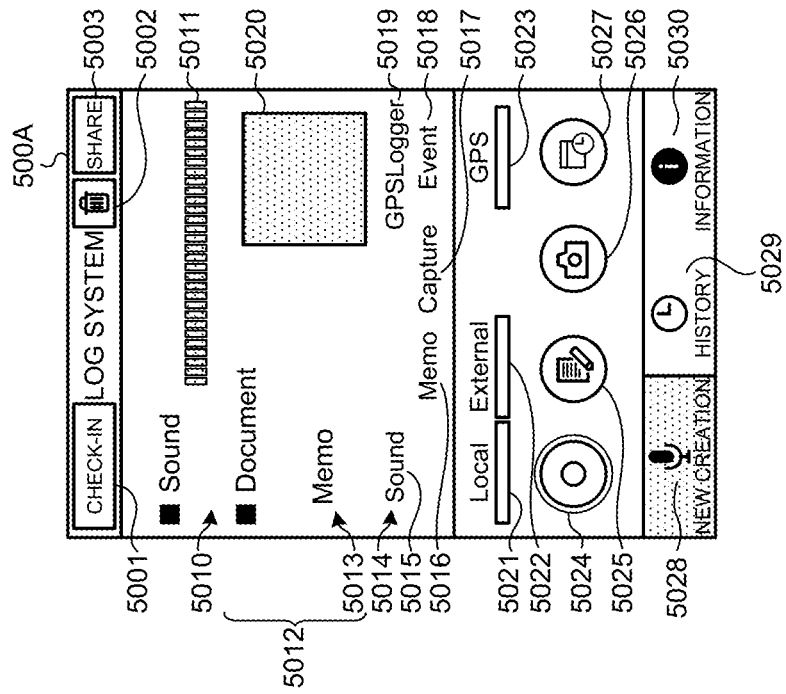

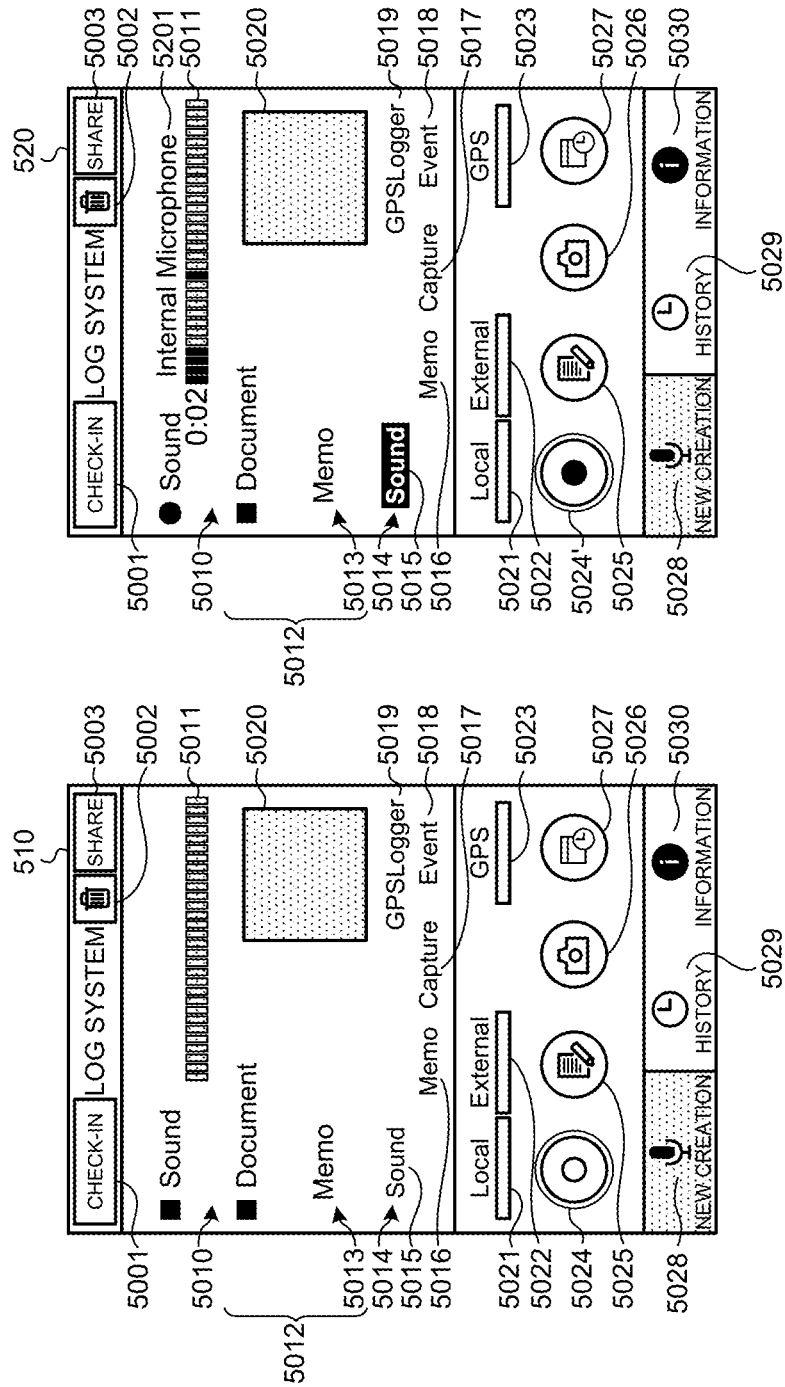

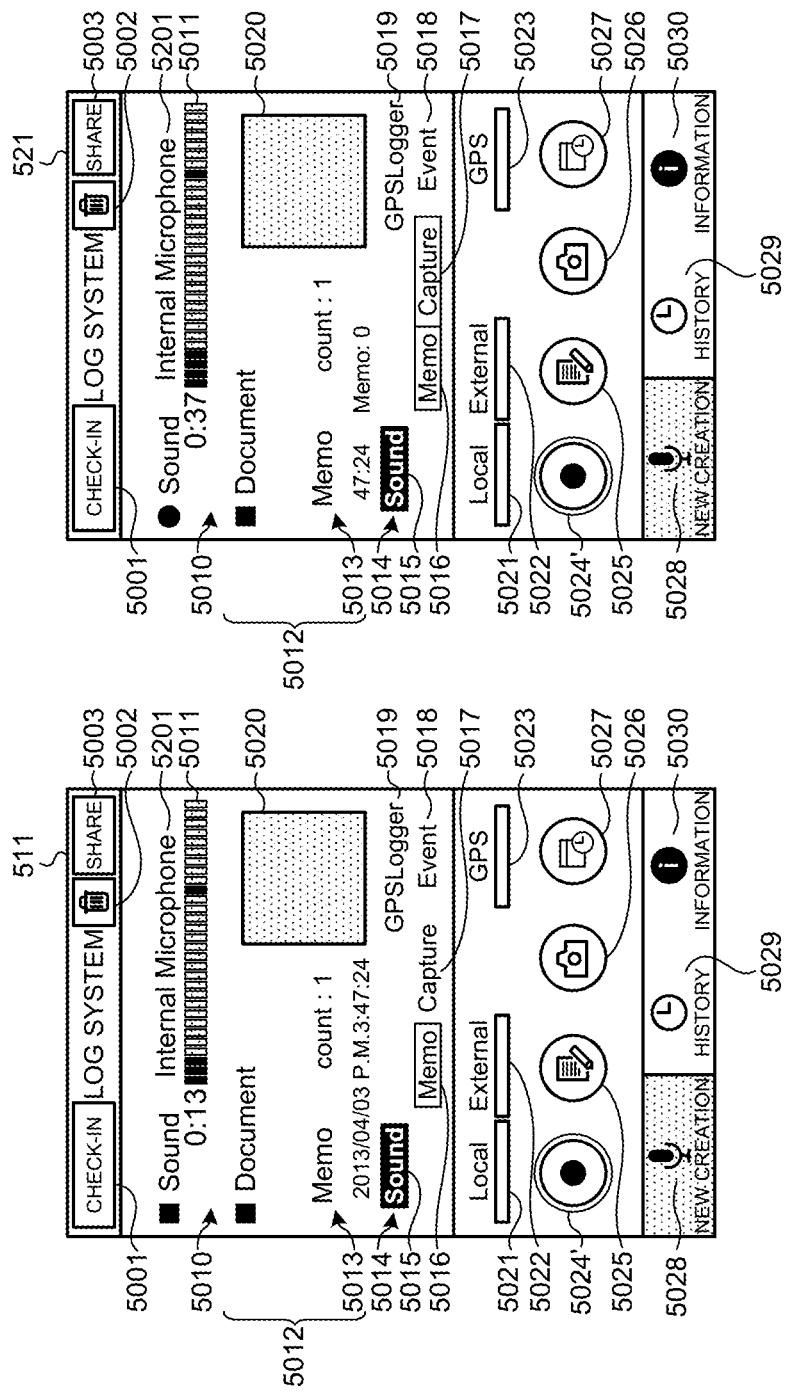

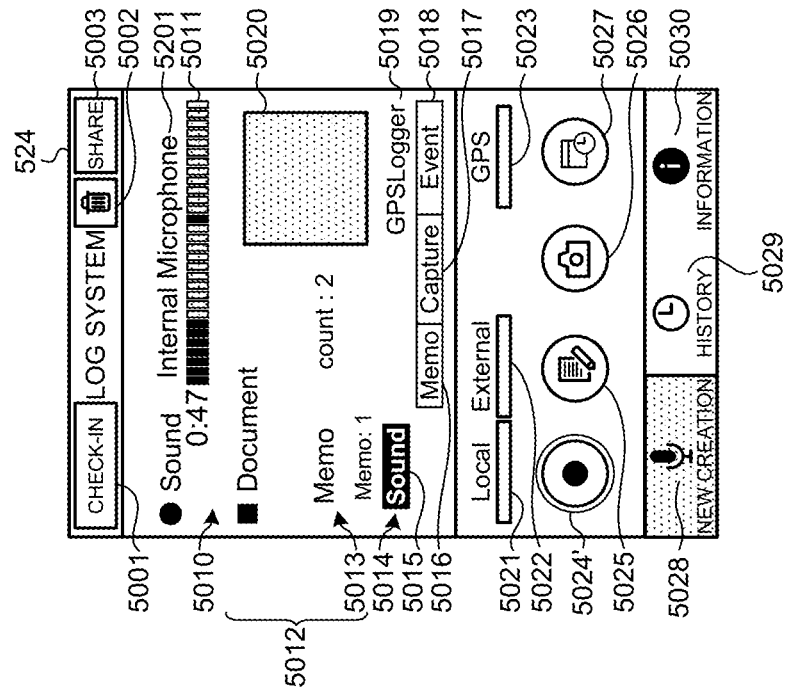
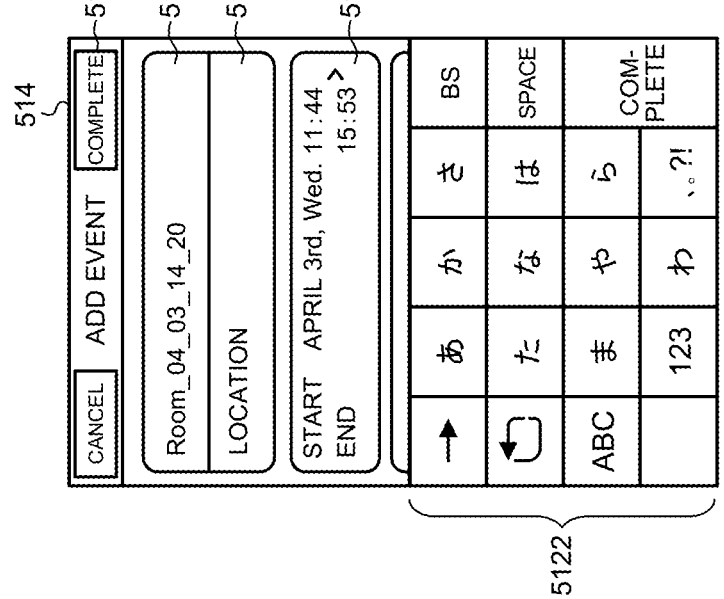

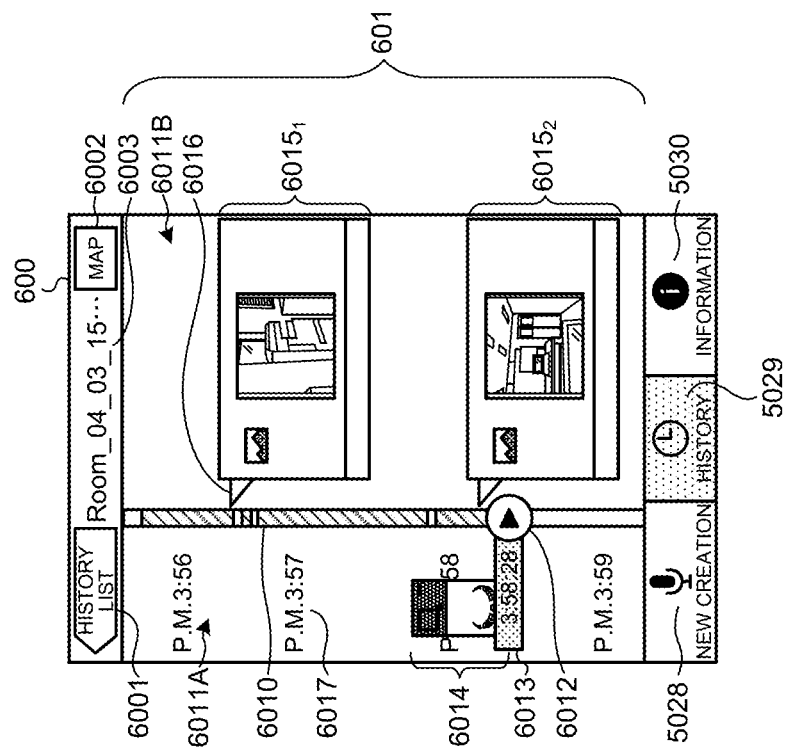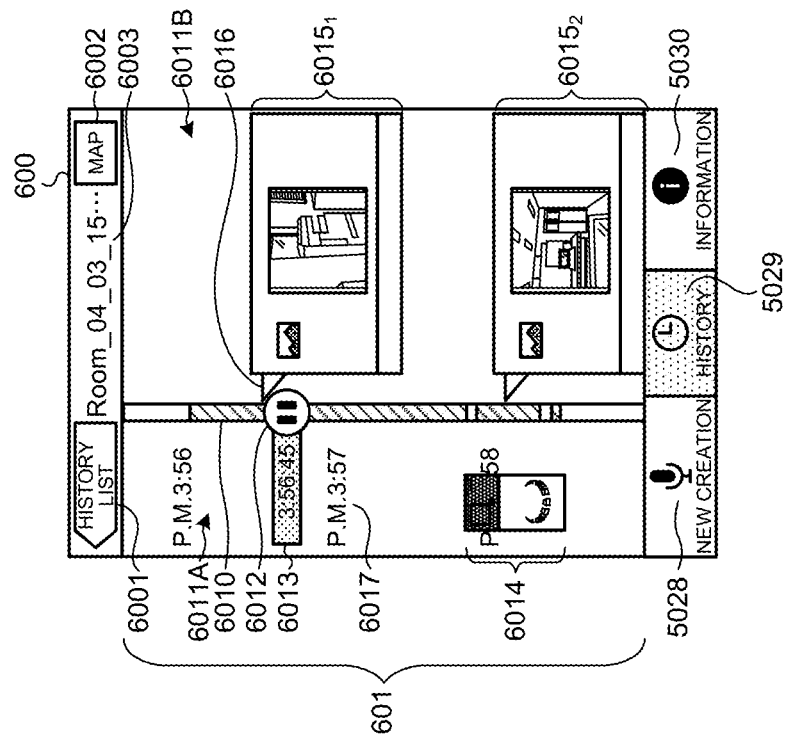

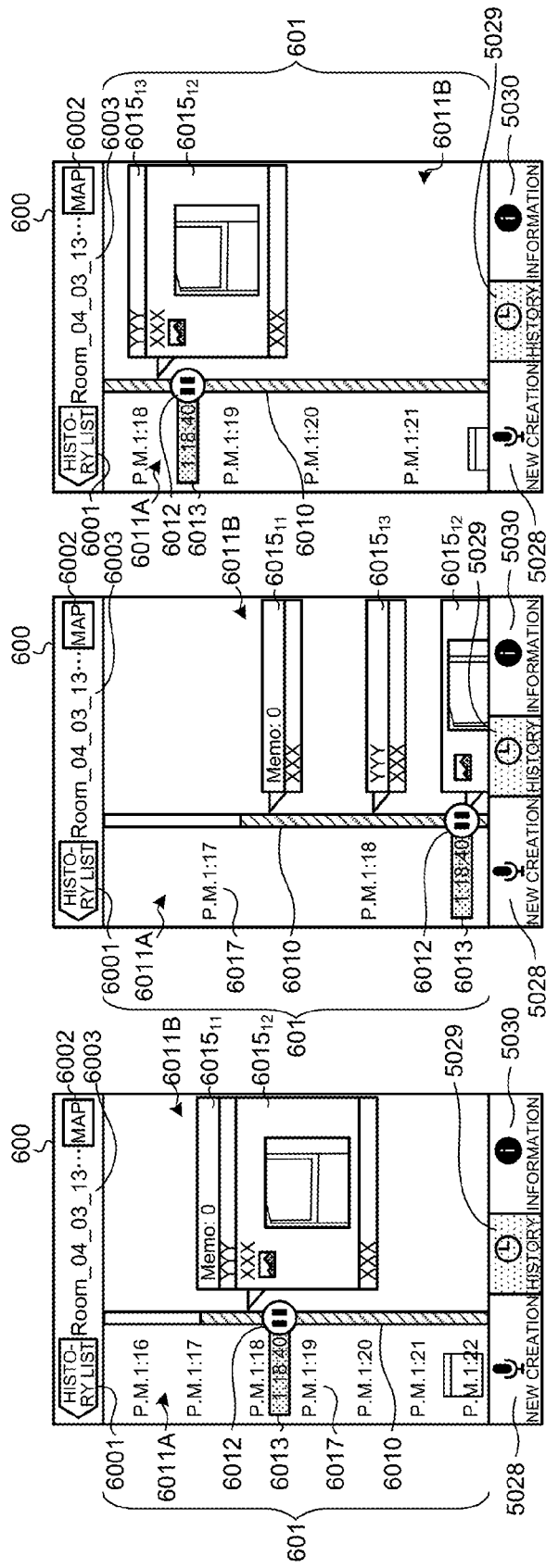

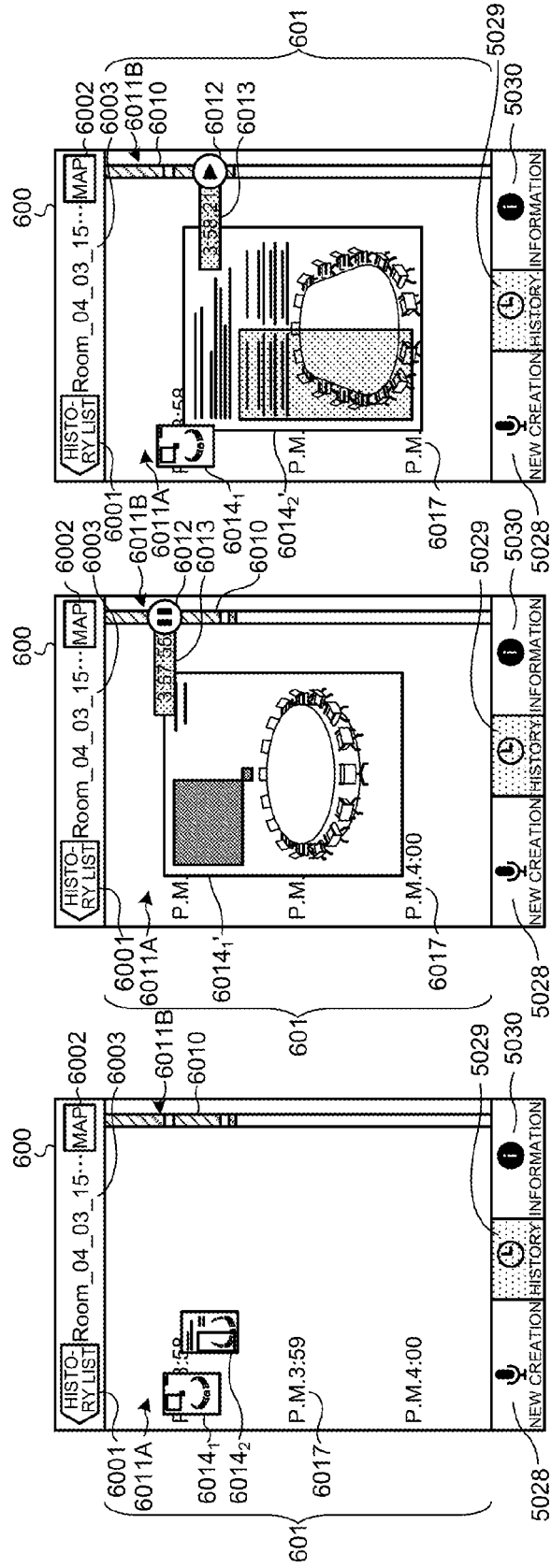

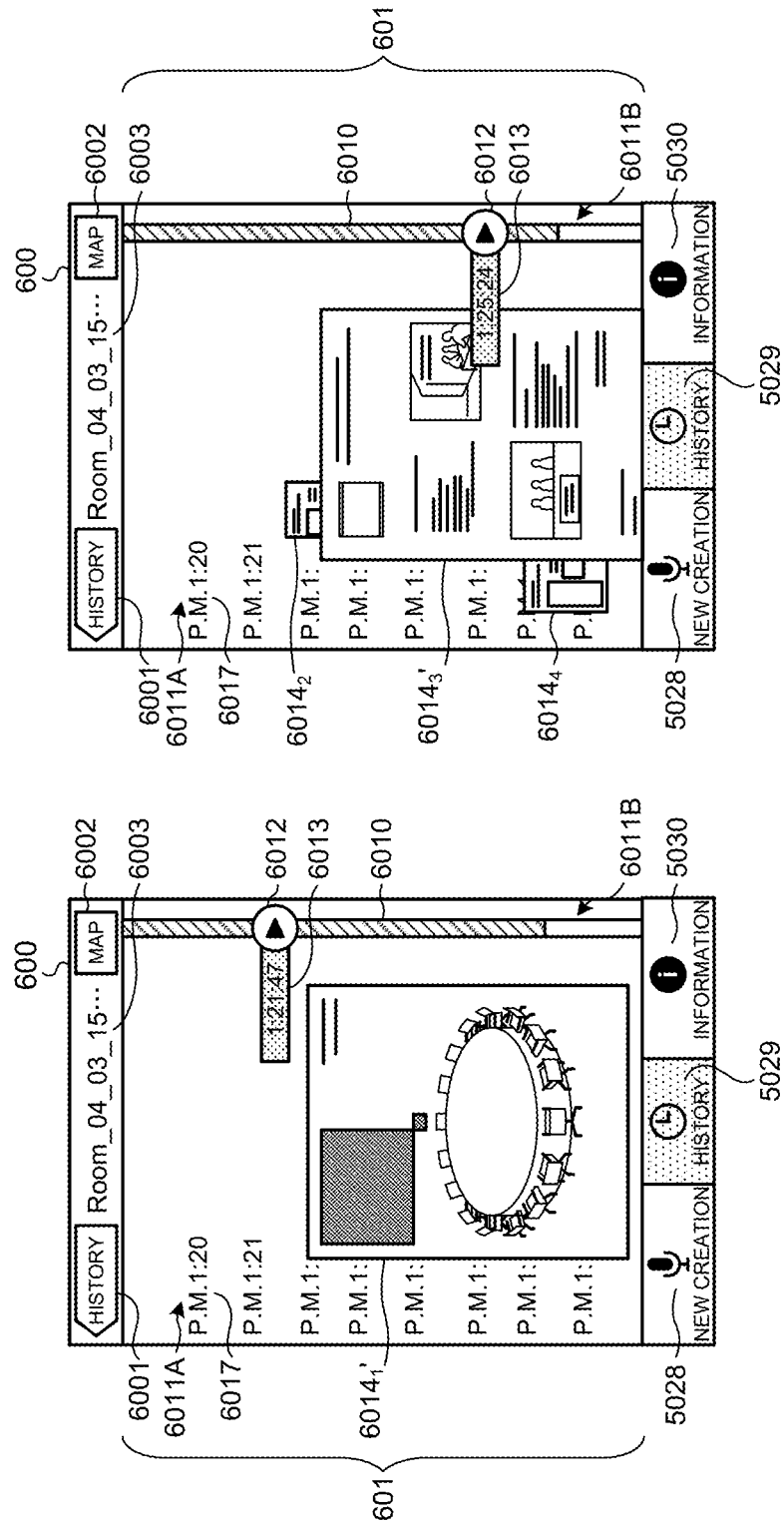

INFORMATION PROCESSING DEVICE AND DISPLAY CONTROL METHOD

CROSS-REFERENCE TO RELATED APPLICATIONS

The present application claims priority to and incorporates by reference the entire contents of Japanese Patent Application No. 2013-097849 filed in Japan on May 7, 2013.

BACKGROUND OF THE INVENTION

1. Field of the Invention

The present invention relates to an information processing device and a display control method.

2. Description of the Related Art

Generally, in conferences and the like, a plurality of participants hold discussions using printed materials, material images projected on a projector device, writing on a whiteboard, and the like. Each of the participants can photograph the material images or the content of writing to acquire them as image data, or can record the content of discussion to acquire the content as voice data, so that the conference can be recorded and kept as information with a time axis of an individual activity. Each of the participants can leave a memo by computer input as needed. Each of the participants can also record an individual activity by video-taping the conference.

When the record of the conference is browsed, consistency of pieces of information with time axis is important. That is, the content of the conference can be grasped more precisely by clarifying a causal relation between the pieces of information kept in the record. As described above, a conference recording system has been developed for integrally managing each piece of the content related to the conference in association with the time axis.

For example, Japanese Patent Application Laid-open No. 2008-172582 describes an apparatus for creating and reproducing a conference record in which sounds and video are recorded using a computer to record memo data input through the computer during the recording of sounds and video while associating the memo data with elapsed time of the recording. In addition, for example, Japanese Patent Application Laid-open No. 2006-146415 describes a conference support system that associates content such as a voice, writing, and an individual memo with recording time of the content to be registered as conference record data, and manages the conference record data in association with video data of a conference scene.

In recent years, tablet computers and wireless communication using tablet computers have been widely used, so that an information presentation system such as a paperless conference system is in practical use in which materials are held as image data and each of the participants presents the materials by sharing the image data using a tablet computer. There is a demand to handle the materials presented by the information presentation system in a similar manner as the voice data or image data as described above.

However, in the related art, such cooperation with an external information presentation system is not taken into consideration.

Therefore, there is a need to cooperate with an external information presentation system and enable the information to be recorded and browsed in association with a time axis.

SUMMARY OF THE INVENTION

According to an embodiment, an information processing device includes an operation unit, a first communication unit, a first content acquisition unit, a second content acquisition unit, a content storage unit, a display; and a display control unit. The operation unit receives a user's operation. The first communication unit performs communication with an external device. The first content acquisition unit acquires first content that is generated in response to the user's operation received by the operation unit. The second content acquisition unit acquires second content received from the external device via the communication performed by the first communication unit. The content storage unit stores therein the first content and the second content in association with their respective acquisition times when the first content and the second content are acquired. The display control unit causes the display to: display a time axis as well as a first display region and a second display region not overlapping with each other; display the first content stored in the content storage unit at a position on the time axis indicating the time associated with the first content in the first display region; and displays the second content stored in the content storage unit at a position on the time axis indicating the time associated with the second content in the second display region.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A to 5F are diagrams illustrating an example of other tables that are associated with each other by a meeting ID in the meeting list table according to the first embodiment;

FIGS. 9A and 9B are diagrams illustrating an example of an initial screen according to the first embodiment;

FIGS. 10A and 10B are diagrams illustrating an example of a screen during the recording operation according to the first embodiment;

FIGS. 11A and 11B are diagrams illustrating an example of the screen during the recording operation according to the first embodiment;

FIGS. 14A and 14B are diagrams illustrating an example of the screen during the recording operation according to the first embodiment;

FIGS. 27A and 27B are diagrams for illustrating a log information browsing screen according to the first embodiment;

FIGS. 28A to 28C are diagrams for illustrating the log information browsing screen according to the first embodiment;

FIGS. 29A to 29C are diagrams for illustrating the log information browsing screen according to the first embodiment;

FIGS. 31A and 31B are diagrams for illustrating the log information browsing screen according to the first embodiment;

DETAILED DESCRIPTION OF THE PREFERRED EMBODIMENTS

Various embodiments are described in detail with reference to accompanying drawings.

First Embodiment

Figure 1:
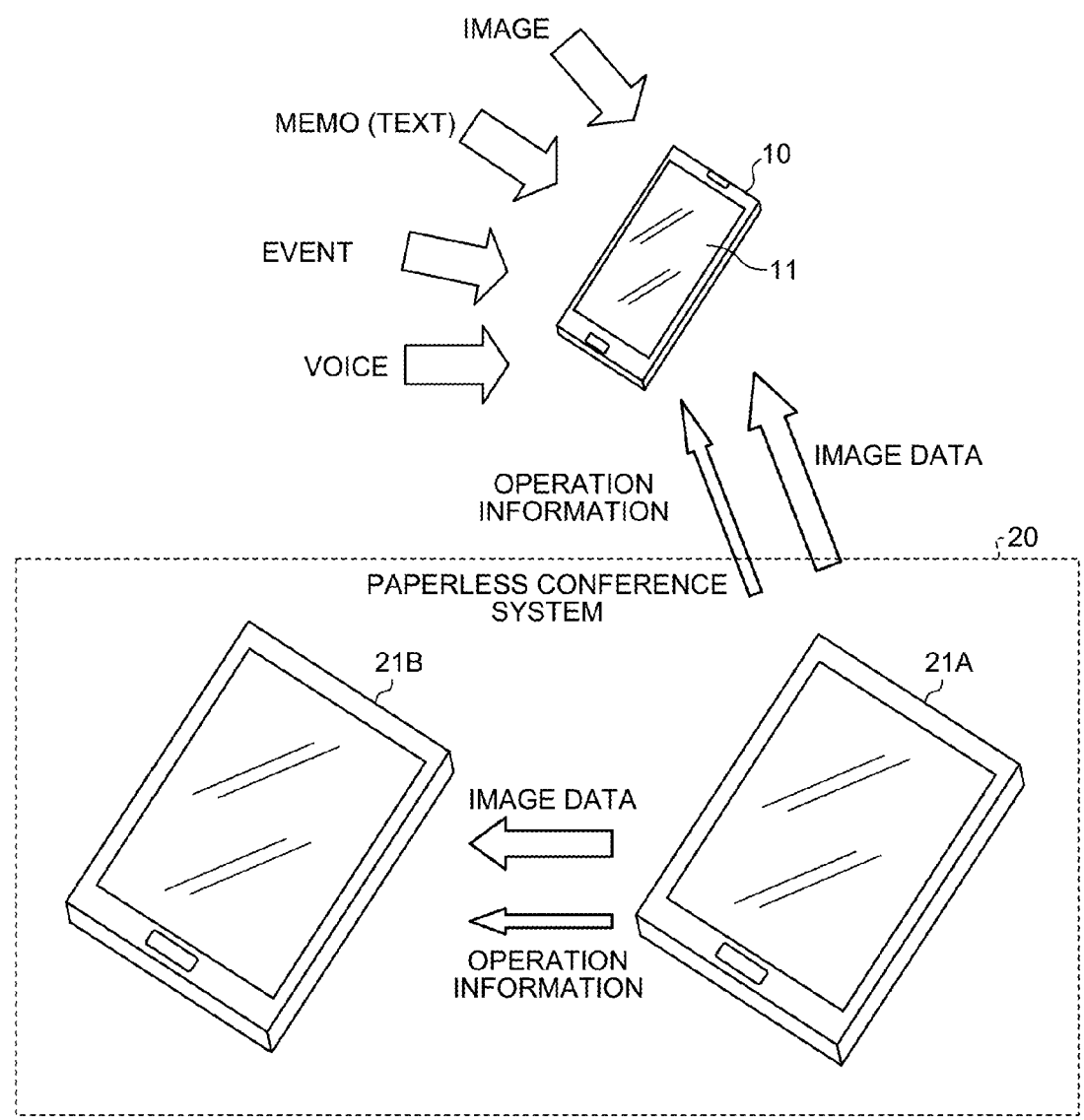
FIG. 1 is a diagram schematically illustrating the configuration of an information processing system according to a first embodiment.

FIG. 1 is a diagram schematically illustrating the configuration of an information processing system according to a first embodiment. The information processing system according to the first embodiment includes a multifunctional portable terminal 10 serving as an information processing device, and a paperless conference system 20. The paperless conference system 20 is configured such that a plurality of paperless conference system terminals 21A and 21B share image data and operation information about image data (page operation information).

The multifunctional portable terminal 10 according to the first embodiment stores various pieces of data such as image data, text data, present position information, and voice data that are acquired through a certain input operation by a user in association with time information indicating the time when each piece of the data is acquired. The multifunctional portable terminal 10 registers, as a set of log information, the pieces of data stored in association with the time information corresponding to a series of action of the user. The multifunctional portable terminal 10 acquires the image data transmitted from an external device such as the paperless conference system terminal 21A, and the operation information on the image data to share the image data and the operation information with the paperless conference system 20. The multifunctional portable terminal 10 can associate the operation information acquired from the paperless conference system 20 with the time information indicating the time when the operation information is acquired, and register the associated information to be included in the log information.

The user can easily reproduce his/her own series of action by browsing the log information registered in the multifunctional portable terminal 10 along a time axis. The user can also easily grasp relation among the pieces of data by displaying the pieces of data along the time axis.

Multifunctional Portable Terminal

First, the following describes the multifunctional portable terminal 10 according to the first embodiment. Examples of the multifunctional portable terminal 10 include a smartphone or a tablet computer. The multifunctional portable terminal 10 includes a microphone, a speaker, and a camera, and has a communication function. The multifunctional portable terminal 10 can execute a plurality of functions such as telephone communication, recording and reproduction of a voice, acquisition of an image by photographing, and data communication. The multifunctional portable terminal 10 is not limited thereto, and may be other information processing device such as a personal computer.

The multifunctional portable terminal 10 has a function for receiving signals from the global positioning system (GPS), and can acquire present position information indicating a present position utilizing the GPS. Hereinafter, the function for acquiring the present position information utilizing the GPS is referred to as a GPS function.

The multifunctional portable terminal 10 further includes a touch panel 11. The touch panel 11 is configured such that a display unit is integrated with an input unit through which an input operation by contact can be performed. The touch panel 11 configures a graphical user interface (GUI) by linking display with a contact position.

As methods for input operation on the touch panel 11, the following defines a tap operation, a long-press operation, a swipe operation, a flick operation, and a pinch operation. The tap operation is an operation for touching the touch panel 11 for a short time, and can be divided into operations such as a single-tap operation, a double-tap operation, and a triple-tap operation depending on the number of times of contact at a time interval in a predetermined range. The long-press operation is an operation for maintaining the contact state with respect to the same part of the touch panel 11 for a predetermined time or more. The swipe operation is an operation for moving the contact position while keeping contact with the touch panel 11, that is, an operation for stroking the touch panel 11. The flick operation is an operation for swiping the touch panel quickly after the tap operation. The pinch operation is an operation for touching two points on the touch panel 11 at the same time, and moving at least one of the two contact positions while keeping contact therewith. An operation to reduce the distance between the two points is referred to as a pinch-in operation, and an operation to increase the distance between the two points is referred to as a pinch-out operation.

The multifunctional portable terminal 10 can acquire image data, text data, and voice data according to the input operation on the touch panel 11. The image data and the text data are content each represented with one time on the time axis. The multifunctional portable terminal 10 stores the image data and the text data in association with their respective pieces of time information indicating the times when the image data and the text data are acquired. The multifunctional portable terminal 10 can also store tag data representing one time in association with the time information indicating the time.

The voice data is represented with two times on the time axis including a start time and an end time. The multifunctional portable terminal 10 stores the voice data in association with each piece of time information indicating the start time when the data acquisition is started and the end time when the data acquisition is ended.

The multifunctional portable terminal 10 stores the present position information acquired through the GPS function in association with the time information indicating the time when the information is acquired.

The multifunctional portable terminal 10 can store, as event information, various pieces of data such as image data, text data, present position information, and voice data acquired through a series of input operations. For example, information indicating each piece of data and the time information associated with the each piece of data are associated with one event identifier, so as to be registered as the event information in a calendar application mounted on the multifunctional portable terminal 10.

The multifunctional portable terminal 10 can arrange each piece of data stored as the event information on the time axis in a time series manner to be displayed on the display unit of the touch panel 11 according to the associated time information. In response to a predetermined operation on the touch panel 11, the multifunctional portable terminal 10 performs changing a scale for the time axis, moving a time range indicated by the time axis, reproduction control of the voice data (reproduction/stop), magnification/reduction of the image data, displaying the text data, or displaying a map image based on the present position information, for example.

Figure 2:
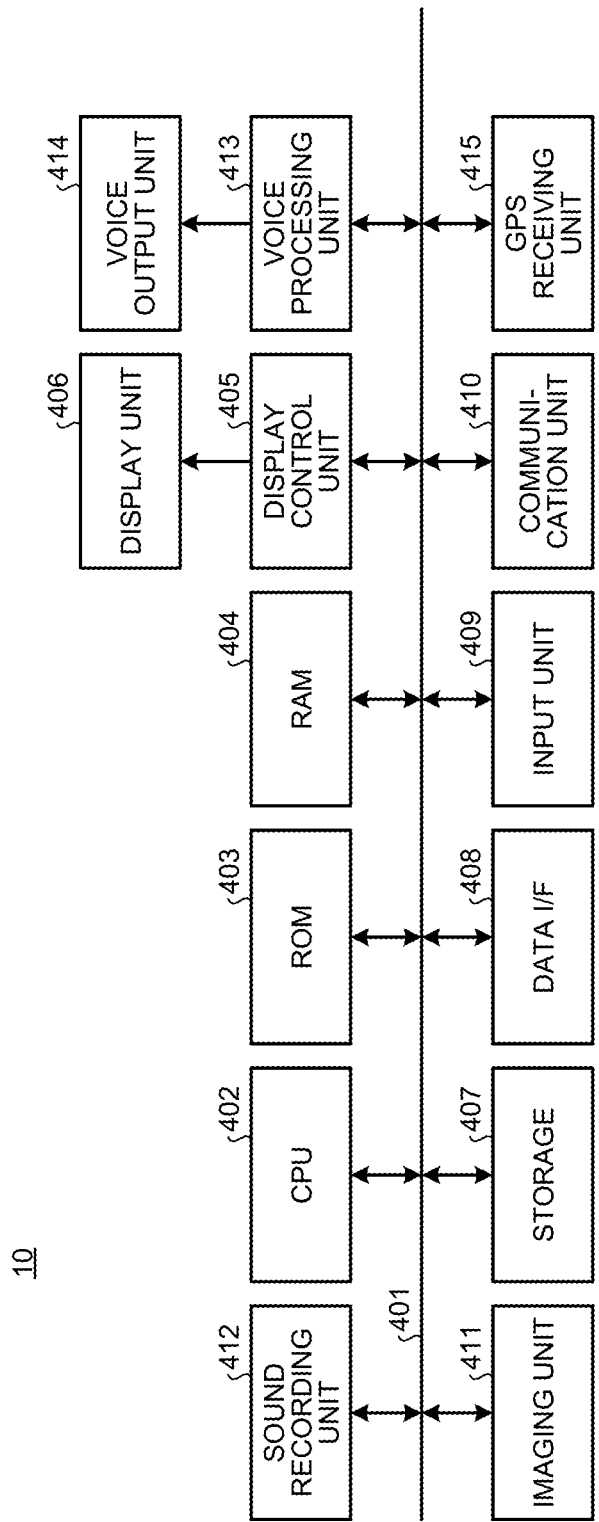
FIG. 2 is a block diagram illustrating a configuration example of hardware of a multifunctional portable terminal according to the first embodiment.

FIG. 2 is a diagram illustrating a configuration example of hardware of the multifunctional portable terminal 10. In FIG. 2, because the configuration of a telephone function included in the multifunctional portable terminal 10 is not directly related to the gist of the first embodiment, the description thereof will not be provided.

In the multifunctional portable terminal 10 exemplified in FIG. 2, a CPU 402, a ROM 403, a RAM 404, and a display control unit 405 are connected to a bus 401. A storage 407, a data I/F 408, an input unit 409, a communication unit 410, an imaging unit 411, a sound recording unit 412, a voice processing unit 413, and a GPS receiving unit 415 are connected to the bus 401. The storage 407 is a storage medium that can store the data in a non-volatile manner, and examples thereof include a non-volatile semiconductor memory such as a flash memory. The embodiment is not limited thereto, and a hard disk drive may also be used as the storage 407.

The CPU 402 controls the entire multifunctional portable terminal 10 using the RAM 404 as a work memory according to a program stored in the ROM 403 and the storage 407. The display control unit 405 converts a display control signal generated by the CPU 402 into a signal that can be displayed by a display unit 406, and outputs the converted signal.

The storage 407 stores various pieces of data or a program to be executed by the CPU 402 described above. The storage 407 and the ROM 403 may share a single rewritable non-volatile semiconductor memory, for example. The data I/F 408 inputs/outputs data to/from an external device. The data I/F 408 can employ an interface for short-range wireless communication such as Bluetooth (registered trademark).

The display control unit 405 drives the display unit 406 based on the display control signal generated by the CPU 402. The display unit 406 includes a liquid crystal display (LCD) for example, and is driven by the display control unit 405 to perform display corresponding to the display control signal.

The input unit 409 includes an input device that receives a user's input. The user can give an instruction to the portable terminal 40 by operating the input device according to the display on the display unit 406, for example. The input unit 409 and the display unit 406 are integrally formed to be the touch panel 11.

The communication unit 410 includes a communication I/F for performing communication via a network in a wireless manner according to the control by the CPU 402.

The imaging unit 411 includes an optical system, an image pickup device, and a control drive circuit for the optical system and the image pickup device, and performs predetermined processing on an imaging signal output from the image pickup device to output the signal as image data. The imaging unit 411 executes functions such as imaging or zooming according to the instruction through a user operation on the input unit 409. The image data output from the imaging unit 411 is transmitted to the CPU 402 via the bus 401, subjected to certain image processing according to a program, and stored in the storage 407.

The sound recording unit 412 includes a microphone serving as a voice acquisition unit, and converts an analog voice signal output from the microphone into voice data based on a digital signal to output the voice data. The voice processing unit 413 performs certain voice processing on the voice data output from the sound recording unit 412 and stores the data in the storage 407. A voice output unit 414 such as a speaker is connected to the voice processing unit 413. The voice processing unit 413 reads out, for example, the voice data from the storage 407, converts the voice data into an analog voice signal and performs amplification processing thereon, and supplies the analog voice signal to the voice output unit 414. The voice output unit 414 converts the supplied analog voice signal into a voice and outputs the voice.

The GPS receiving unit 415 executes the GPS function. That is, the GPS receiving unit 415 receives signals transmitted from a plurality of GPS satellites to perform positioning, and acquires positional information indicating the present position.

Figure 3:
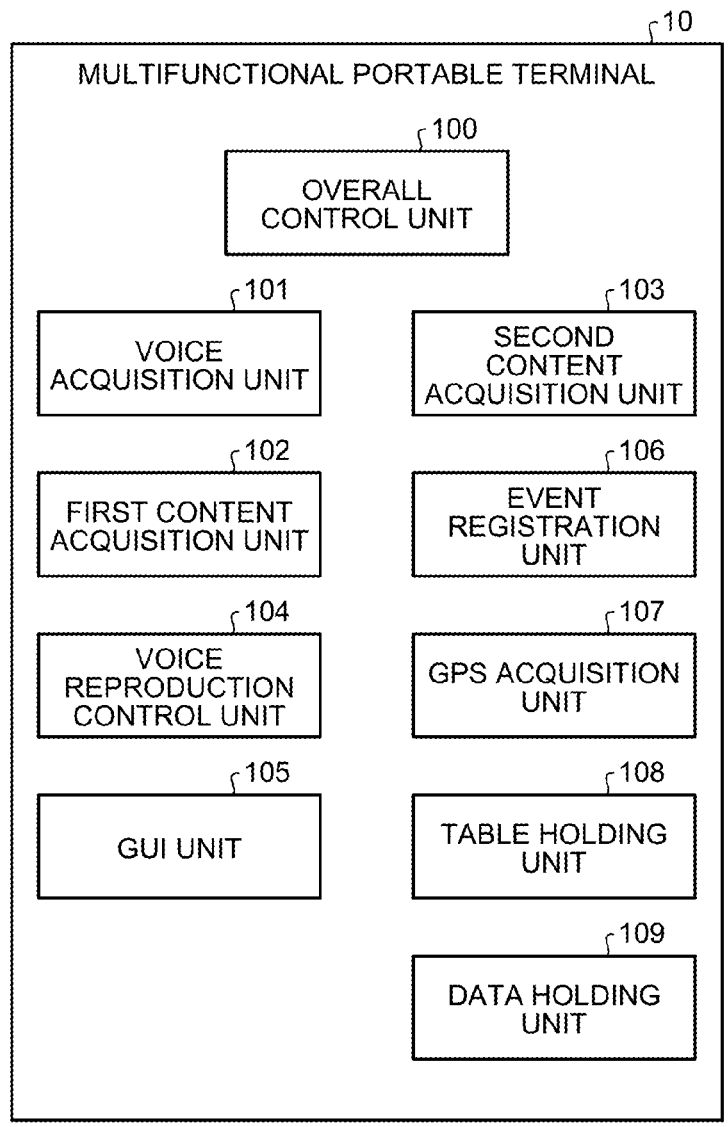
FIG. 3 is an exemplary functional block diagram illustrating functions of the multifunctional portable terminal according to the first embodiment.

FIG. 3 is an exemplary functional block diagram illustrating functions of the multifunctional portable terminal 10 according to the first embodiment. The multifunctional portable terminal 10 includes an overall control unit 100, a voice acquisition unit 101, a first content acquisition unit 102, a second content acquisition unit 103, a voice reproduction control unit 104, a GUI unit 105, an event registration unit 106, a GPS acquisition unit 107, a table holding unit 108, and a data holding unit 109. The overall control unit 100 controls, for example, an entire operation of the multifunctional portable terminal 10 through an operation by the CPU 402 according to a program.

The GUI unit 105 generates a display screen displayed by the display unit 406 according to a command from the overall control unit 100. The GUI unit 105 detects a position on the display screen at which the input operation is performed on the input unit 409, and a method for the input operation. That is, the GUI unit 105 detects a method by which the input operation is performed from the tap operation (such as a single-tap operation and a double-tap operation), the long-press operation, the swipe operation, the flick operation, and the pinch operation (a pinch-in operation and a pinch-out operation), and detects the position on the display unit 406 at which the input operation is performed. The GUI unit 105 transmits the information indicating the detected operation method and operation position to the overall control unit 100. The overall control unit 100 outputs a command for executing a corresponding function according to the display screen displayed by the GUI unit 105 and the information indicating the operation method and position transmitted from the GUI unit 105.

The table holding unit 108 causes the storage 407 to store and hold a table that stores attribute information of each piece of data acquired by the multifunctional portable terminal 10. The data holding unit 109 causes the storage 407 to store and hold a main body of each piece of data acquired by the multifunctional portable terminal 10 in association with identification information for identifying each piece of data.

The voice acquisition unit 101 controls the sound recording unit 412, acquires the voice data output from the sound recording unit 412, adds the identification information for identifying the voice data to the acquired voice data to transmit the voice data to the data holding unit 109, and transmits the attribute information of the voice data to the table holding unit 108. The attribute information includes the time information indicating the start time when the voice data acquisition is started and the end time when the voice data acquisition is ended.

The first content acquisition unit 102 acquires content generated inside of the multifunctional portable terminal 10 and represented with one time as first content. The first content acquisition unit 102 adds the identification information for identifying the first content to the first content and transmits it to the data holding unit 109, and transmits attribute information of the first content to the table holding unit 108. The attribute information includes time information indicating the time when the first content is acquired. The first content acquired by the first content acquisition unit 102 includes the text data and the tag data input through the input operation on the input unit 409, and image data generated by imaging a subject with the imaging unit 411.

The second content acquisition unit 103 acquires the image data transmitted from the paperless conference system terminal 21A serving as an external device, adds the identification information for identifying the image data to the acquired image data to transmit the acquired image data to the data holding unit 109 as second content, and stores the attribute information of the image data in the table holding unit 108. The attribute information includes time information indicating the time when the second content is acquired.

The second content acquisition unit 103 acquires page operation information transmitted from the paperless conference system terminal 21A. The page operation information is transmitted to the data holding unit 109, and stored in the storage 407 in association with the time information indicating the time when the information is acquired and the image data serving as the second content.

The voice reproduction control unit 104 controls reproduction of the voice data held in the data holding unit 109. That is, according to a command from the GUI unit 105, the voice reproduction control unit 104 selects a piece of voice data corresponding to the command from the pieces of voice data held in the data holding unit 109, and controls reproduction and reproduction stop of the selected piece of voice data.

The event registration unit 106 performs registration processing of a series of data acquisition operations by the voice acquisition unit 101, the first content acquisition unit 102, and the second content acquisition unit 103. The event registration unit 106 registers the series of data acquisition operations as one event in the calendar application mounted on the multifunctional portable terminal 10, for example.

When the GPS function is activated, the GPS acquisition unit 107 controls the GPS receiving unit 415 and acquires latitude and longitude information. The latitude and longitude information is held in the table holding unit 108 in association with time information indicating the time when the information is acquired.

The following describes a table held in the table holding unit 108. In the first embodiment, the table holding unit 108 holds a meeting list table, an event table, a GPS trace table, a paperless conference system table, a capture table, a sound table, and a memo table.

Figure 4:
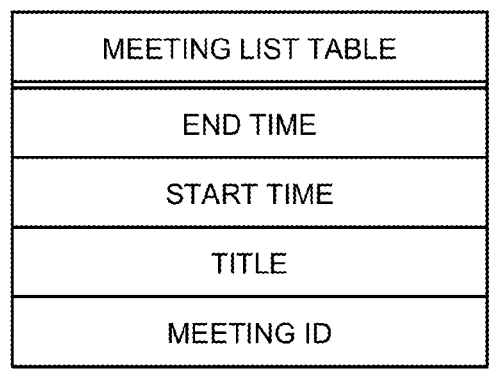
FIG. 4 is a diagram illustrating an example of a record in a meeting list table for defining log information according to the first embodiment.

FIG. 4 is a diagram illustrating an example of a record in the meeting list table for defining the log information according to the first embodiment. The meeting list table includes an end time, a start time, a title, and a meeting ID as the attribute information. The meeting ID is identification information for identifying the record in the meeting list table, and identifies each piece of the log information. The title is a title given to the log information identified with the meeting ID. The end time and the start time are an end time and a start time of the log information identified with the meeting ID.

FIGS. 5A to 5F are diagrams illustrating an example of other tables that are associated with each other by the meeting ID in the meeting list table according to the first embodiment. FIG. 5A illustrates an example of the record in the event table. The event table stores the attribute information of the event when the event is registered in the calendar application. The record of the event table includes a creator, the end time, an event ID, the meeting ID, note information, the start time, the title, and the identification information. The creator indicates, for example, a name of a user who creates the event, such as a user name of the multifunctional portable terminal 10. The end time indicates the end time of the event. The event ID indicates the identification information for identifying the event in the calendar application serving as a registration destination. The meeting ID indicates the identification information for identifying the event, and corresponds to the meeting ID in the meeting list table of FIG. 4. The note information indicates arbitrary piece of memo information. The start time indicates the start time of the event. The start time and the end time described above may be the same as the start time and the end time in the meeting list table. The title indicates the title of the event. The identification information indicates the identification information for identifying the record in the event table.

FIG. 5B illustrates an example of the record in the GPS trace table. The GPS trace table stores the attribute information in a case in which the GPS acquisition unit 107 acquires the latitude and longitude information according to the command from the GUI unit 105. The record of the GPS trace table includes a capture time, the creator, the latest capture time, latitude, longitude, the meeting ID, and the identification information. The capture time is time information indicating the time when the GPS acquisition unit 107 starts to acquire the latitude and longitude information through an input operation on the GUI unit 105. The creator indicates the user name of the multifunctional portable terminal 10. The latest capture time indicates time information indicating the latest time when the GPS acquisition unit 107 acquires the latitude and longitude information. When commanded to acquire the latitude and longitude information by the GUI unit 105, for example, the GPS acquisition unit 107 acquires the latitude and longitude information at predetermined time intervals (for example, every ten minutes). The latitude and the longitude indicate the latitude and longitude information captured by the GPS acquisition unit 107 at the time indicated by the latest capture time. The meeting ID indicates the identification information for identifying the conference, and corresponds to the meeting ID in the meeting list table of FIG. 4. The identification information indicates the identification information for identifying the record in the GPS trace table.

FIG. 5C illustrates an example of the record in the paperless conference system table. The paperless conference system table stores attribute information of the paperless conference system 20 from which the multifunctional portable terminal 10 acquires the second content, for example, in which the paperless conference system terminal 21A participates. The record of the paperless conference system table includes the end time, the meeting ID, a name, a pass code, a paperless conference system ID, the start time, and the identification information. The end time indicates the end time of the conference using the paperless conference system 20 of interest. The meeting ID indicates the identification information for identifying the conference in which the multifunctional portable terminal 10 participates, and corresponds to the meeting ID in the meeting list table of FIG. 4. The name indicates the name of the paperless conference system 20 of interest, for example. The pass code indicates information indicating whether there is access restriction with a pass code with respect to the conference using the paperless conference system 20 of interest. A main body of the pass code is held by the paperless conference system terminals 21A and 21B that participate in the paperless conference system 20 of interest, for example. The paperless conference system ID indicates the identification information for identifying the conference using the paperless conference system of interest. The start time indicates the start time of the conference using the paperless conference system 20 of interest. The identification information indicates the identification information for identifying the record in the paperless conference system table.

FIG. 5D illustrates an example of the record in the capture table. The capture table stores attribute information in a case in which the first content acquisition unit 102 acquires the image data by controlling the imaging unit 411. The record of the capture table includes the creator, the latitude, the longitude, the meeting ID, a time, a URL, and the identification information. The creator indicates the user name of the multifunctional portable terminal 10. The latitude and the longitude indicate the latitude and longitude information acquired by the GPS acquisition unit 107. The meeting ID indicates the identification information for identifying the conference, and corresponds to the meeting ID in the meeting list table of FIG. 4. The time indicates time information indicating the time when the image data is acquired. The URL indicates a uniform resource locator (URL) indicating a location where the image data is stored. The identification information indicates identification information for identifying the record in the capture table.

FIG. 5E illustrates an example of the record in the sound table. The sound table stores attribute information obtained in a case in which the voice acquisition unit 101 acquires the voice data by controlling the sound recording unit 412. The record of the sound table includes the creator, the end time, the meeting ID, the start time, the URL, and the identification information. The creator indicates the user name of the multifunctional portable terminal 10. The end time is time information indicating the time when the acquisition of the voice data is finished. The meeting ID indicates the identification information for identifying the conference, and corresponds to the meeting ID in the meeting list table of FIG. 4. The start time indicates time information indicating the time when the acquisition of the voice data is started. The URL indicates the URL indicating a location where the voice data is stored. The identification information indicates the identification information for identifying the record in the sound table.

FIG. 5F illustrates an example of the record in the memo table. The memo table stores attribute information obtained in a case in which the first content acquisition unit 102 acquires text data or tag data (hereinafter, collectively referred to as memo data). The record of the memo table includes the creator, an index, the latitude, the longitude, the meeting ID, memo content, the time, and the identification information. The creator indicates the user name of the multifunctional portable terminal 10. The index indicates index information about the memo, and examples thereof include a serial number. The latitude and the longitude indicate the latitude and longitude information acquired by the GPS acquisition unit 107. The meeting ID indicates the identification information for identifying the conference, and corresponds to the meeting ID in the meeting list table of FIG. 4. The memo content indicates memo data acquired by the first content acquisition unit 102. The memo data can be used as the tag data by emptying the memo content. The time indicates time information indicating the time when the memo data is acquired. The identification information indicates identification information for identifying the record in the memo table.

The information processing program according to the first embodiment constructs the voice acquisition unit 101, the first content acquisition unit 102, the second content acquisition unit 103, the voice reproduction control unit 104, the GUI unit 105, and the event registration unit 106. The information processing program is stored in the ROM 403 or the storage 407 in advance and operates on the CPU 402. The information processing program is configured to be stored on a computer connected via a network through the communication unit 410, for example, and to be provided by being downloaded via the network. The embodiment is not limited thereto. The information processing program may be recorded and provided in a computer-readable recording medium such as a compact disc (CD) and a digital versatile disc (DVD) as an installable or executable file.

The information processing program has, for example, a module configuration including respective units described above (the voice acquisition unit 101, the first content acquisition unit 102, the second content acquisition unit 103, the voice reproduction control unit 104, the GUI unit 105, and the event registration unit 106). Actual hardware is configured such that the CPU 402 reads out and executes the information processing program from the storage device such as the ROM 403 and the storage 407, so that the respective units described above are loaded on a main storage device (for example, the RAM 404) to be generated on the main storage device.

Figure 6:
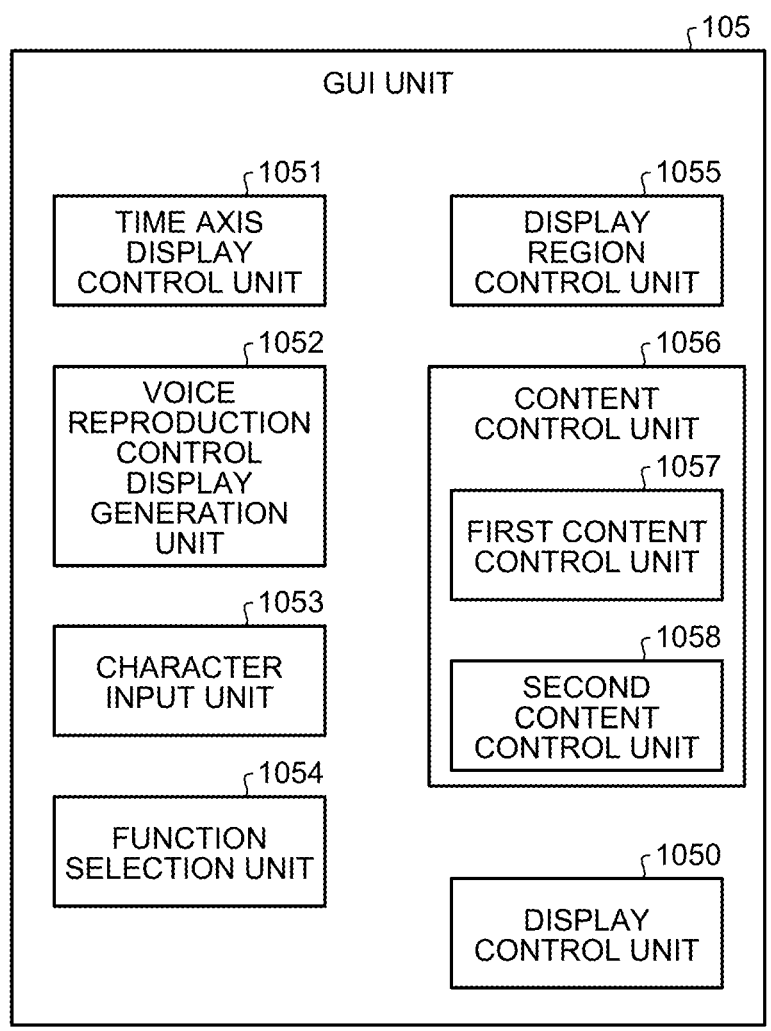
FIG. 6 is an exemplary functional block diagram illustrating functions of a GUI unit according to the first embodiment.

FIG. 6 is an exemplary functional block diagram illustrating functions of the GUI unit 105. The GUI unit 105 includes a display control unit 1050, a time axis display control unit 1051, a voice reproduction control display generation unit 1052, a character input unit 1053, a function selection unit 1054, a display region control unit 1055, and a content control unit 1056.

The time axis display control unit 1051 changes a scale of the time axis, that is, a time length corresponding to a unit length on the display unit 406 according to the command from the overall control unit 100 in response to the input operation on the GUI unit 105, and changes the display in the time axis direction on the display unit 406 accordingly.

The voice reproduction control display generation unit 1052 generates display for commanding reproduction control of the voice data by the voice reproduction control unit 104. The character input unit 1053 generates display for inputting characters. The function selection unit 1054 generates display for selecting each of the functions of the information processing system operating on the multifunctional portable terminal 10 to command to activate the selected function, and generates display indicating whether each of the functions is selected.

The display region control unit 1055 controls a display region of the display unit 406. The display region control unit 1055 provides, to the display unit 406, a first content display region that displays first content such as image data, text data, and tag data, and a second content display region that displays second content acquired from an external device. In this case, the display region control unit 1055 provides the first content display region and the second content display region such that the first content display region and the second content display region share the display of the time axis and do not overlap with each other. The display region control unit 1055 changes a ratio between the width of the first content display region and the width of the second content display region according to the command from the overall control unit 100 in response to the input operation on the GUI unit 105.

The content control unit 1056 includes a first content control unit 1057 and a second content control unit 1058. The first content control unit 1057 controls the display of the first content in the first content display region. Similarly, the second content control unit 1058 controls the display of the second content in the second content display region.

The display control unit 1050 integrally controls respective displays that are generated and controlled by the units described above included in the GUI unit 105. The display control unit 1050 also controls display other than the displays that are generated and controlled by the units.

Paperless Conference System Terminal

Next, the following describes the paperless conference system terminals 21A and 21B that can be applied to the first embodiment. Because the paperless conference system terminals 21A and 21B can be made with similar configuration, the paperless conference system terminal 21A is exemplified herein.

Figure 7:
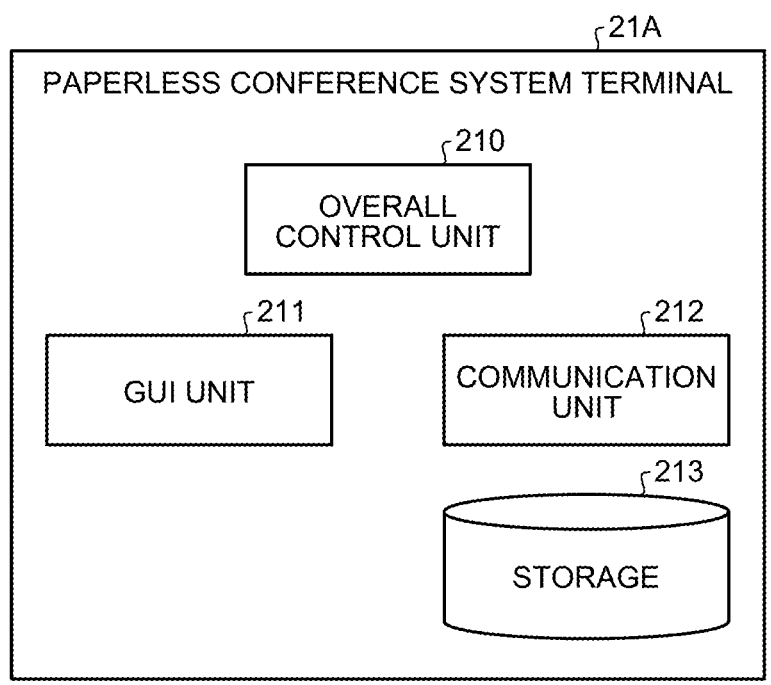
FIG. 7 is an exemplary functional block diagram illustrating functions of a paperless conference system terminal according to the first embodiment.

FIG. 7 is an exemplary functional block diagram illustrating functions of the paperless conference system terminal 21A. The paperless conference system terminal 21A includes an overall control unit 210, a GUI unit 211, a communication unit 212, and a storage 213. The overall control unit 210 controls, for example, an entire operation of the paperless conference system terminal 21A through an operation of the CPU according to a program.

The GUI unit 211 generates a display screen displayed on the display unit of the touch panel, and detects a position on the display screen at which the input operation is performed on the input unit of the touch panel and a method for the input operation. The communication unit 212 controls communication with the other paperless conference system terminal 21B, for example. The communication unit 212 includes a communication I/F using Bluetooth (registered trademark), for example, and can perform communication with the multifunctional portable terminal 10. The storage 213 is a storage medium that can store data in a non-volatile manner, and examples thereof include a non-volatile semiconductor memory such as a flash memory.

In such a configuration, the paperless conference system terminal 21A previously stores, in the storage 213, image data (referred to as material image data) configured of page units and including one or more pages. The first page of the material image data is displayed on the display unit of the GUI unit 211 in the paperless conference system terminal 21A.

For example, certain information such as a conference name or identification information (paperless conference ID) is exchanged between the other paperless conference system terminal 21B and the paperless conference system terminal 21A, so that the conference through the paperless conference system 20 is established. In this case, the paperless conference system terminal 21A transmits the material image data to the paperless conference system terminal 21B. The paperless conference system terminal 21B stores the received material image data in the storage 213 included therein. Along therewith, in the paperless conference system terminal 21B, the first page of the material image data is displayed on the display unit of the GUI unit 211. Accordingly, the same page of the material image data is displayed on the paperless conference system terminals 21A and 21B.

In the paperless conference system terminal 21A, when the user performs, for example, a swipe operation on the GUI unit 211 of the paperless conference system terminal 21A, the displayed page of the material image data is switched to the second page. The paperless conference system terminal 21A transmits page operation information indicating the page switching to the paperless conference system terminal 21B. After receiving the page operation information, the paperless conference system terminal 21B switches the displayed page of the material image data to the second page according to the page operation information.

In this way, in the paperless conference system 20, the paperless conference system terminal 21A serving as a master transmits, to the paperless conference system terminal 21B serving as a slave, the material image data, and subsequently, the page operation information. Accordingly, the paperless conference system terminal 21A and the paperless conference system terminal 21B can share the image to be displayed.

Recording Operation According to First Embodiment

Next, the following describes a recording operation by the multifunctional portable terminal 10 according to the first embodiment. The recording operation of various pieces of data is performed in an event driven manner according to the control by the overall control unit 100 corresponding to the input operation on the input unit 409 corresponding to the screen displayed on the display unit 406 by the GUI unit 105 according to the information processing program according to the first embodiment.

Figure 8:
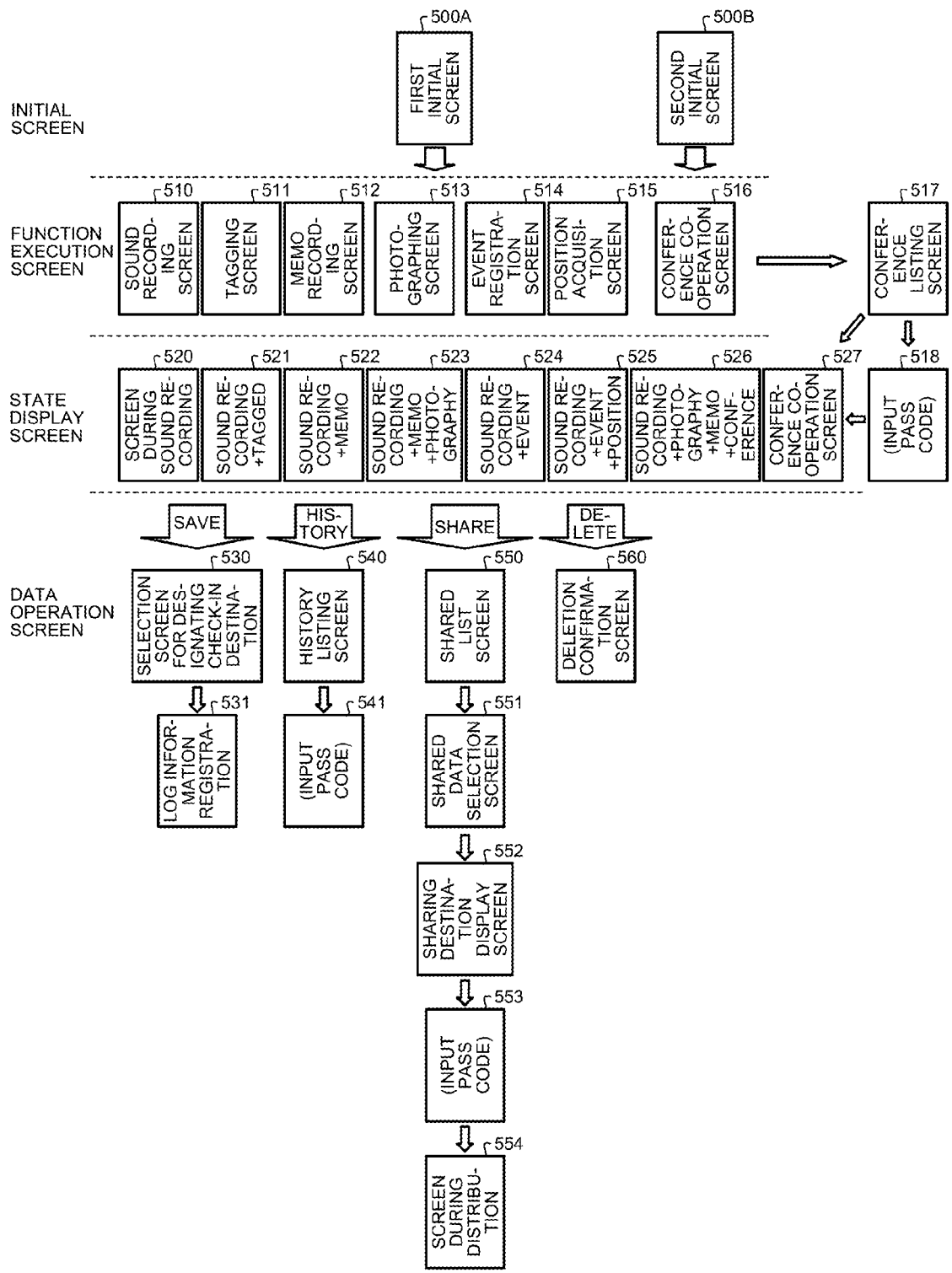
FIG. 8 is a diagram schematically illustrating an example of screen transition due to a recording operation by the multifunctional portable terminal according to the first embodiment.

FIG. 8 is a diagram schematically illustrating an example of screen transition due to the recording operation by the multifunctional portable terminal 10 according to the information processing program of the first embodiment. The screen displayed on the display unit 406 during the recording operation can be schematically divided into four types such as an initial screen, a function execution screen, a state display screen, and a data operation screen. The initial screen is a screen in an initial state for designating the function to be executed by the multifunctional portable terminal 10. The function execution screen is a screen used when the designated function is executed, and the data corresponding to the function is acquired according to the display of the function execution screen, for example. The acquired data is temporarily held by the multifunctional portable terminal 10. The state display screen is a screen indicating a state in which the function is executed with the function execution screen. The state display screen also functions as a screen for designating the function. The data operation screen is a screen for designating an operation for the data temporarily held through the function executed with the function execution screen, and for recorded log information.

In FIG. 8, screens 500A and 500B represent the initial screen, screens 510 to 516 represent the function execution screen, screens 520 to 526 represent the state display screen, and screens 530 to 560 represent the data operation screen. Screens 517, 518, and 527 are screens to be displayed when the multifunctional portable terminal 10 cooperates with the paperless conference system 20. The overall control unit 100 controls the GUI unit 105 according to the information processing program of the first embodiment and causes the display unit 406 to display each of the screens. The overall control unit 100 controls each function of the multifunctional portable terminal 10 based on a detection result, provided by the GUI unit 105, of the operation on the input unit 409 corresponding to each of the screens displayed on the display unit 406.

Initial Screen

FIGS. 9A and 9B are diagrams illustrating an example of the initial screen according to the first embodiment. FIG. 9A illustrates an example of the screen 500A serving as a first initial screen, and FIG. 9B illustrates an example of the screen 500B serving as a second initial screen. The first initial screen of the screen 500A is a screen related to a recording function of data generated inside of the multifunctional portable terminal 10. The second initial screen of the screen 500B is a screen related to a recording function of data acquired from an external device. The first initial screen and the second initial screen are screens in a state in which the recording function or a browsing function of the log information is not executed by the multifunctional portable terminal 10.

The following describes the first initial screen with reference to FIG. 9A. In FIG. 9A, the screen 500A includes four display regions, that is, first to fourth display regions from the upper end to the lower end. The first display region includes buttons 5001 to 5003 for performing designation related to a data operation. The button 5001 is a check-in button for registering pieces of data that are temporarily held through each function executed in the function execution screen as a set of log information. The button 5002 is a delete button for deleting the pieces of data. The button 5003 is a share button for sharing the pieces of data with other device on which the information processing program according to the first embodiment is mounted.

The second display region includes each of the displays indicating a recording state of the data. A display region 5010 in the second display region includes a level meter 5011 indicating a level of the voice data during sound recording. A display region 5012 includes display regions 5013 and 5020 related to the first content and the second content. The display region 5013 displays information about the memo data, and the display region 5020 displays an image using the image data.

A display region 5014 in the second display region includes displays 5015 to 5019 indicating a holding state of each piece of data. The display 5015 indicates whether the voice data is being recorded. The display 5016 indicates whether the memo data is held. The display 5017 indicates an acquisition state of the memo data, the image data, and the positional information. The display 5018 indicates whether event (schedule) information is held. The display 5019 indicates whether the GPS function is turned on.

The third display region includes buttons 5021 and 5022 for switching the first initial screen and the second initial screen, a button 5023 for activating the GPS function, and buttons 5024 to 5027 for controlling the recording (holding) of each piece of data. The buttons 5021 and 5022 are arranged in both of the screens 500A and 500B. By operating the button 5022 when the screen 500A serving as the first initial screen is displayed, the screen display is switched to the screen 500B serving as the second initial screen. By operating the button 5021 when the screen 500B is displayed, the screen display is switched to the screen 500A.

The button 5023 is a GPS log button for instructing start and end of the GPS function. The button 5024 is a sound recording button for instructing start and end of the sound recording. The button 5025 is a memo button for inputting the memo data. The button 5026 is an imaging button for imaging a subject with the imaging unit 411 to acquire the image data. The button 5027 is an event registration button for registering the event (schedule) information.

The fourth display region includes buttons 5028 to 5030 for designating an operation mode. The button 5028 is a new creation button for creating new log information. For example, the meeting list table of FIG. 4 is created in the table holding unit 108 by operating the button 5028, and the meeting ID generated in a predetermined manner and the start time indicating the time when the button 5028 is operated are stored in the meeting list table. Accordingly, a set of log information data is started to be created.

The button 5029 is a history button for browsing the registered log information. The button 5030 is a button for displaying various pieces of information about the information processing program, for example. By operating the button 5030, for example, pieces of information are displayed such as version information of the information processing program, information about the recorded log information, and information about the multifunctional portable terminal 10 itself on which the information processing program is mounted.

The following describes the second initial screen with reference to FIG. 9B. The screen 500B serving as the second initial screen exemplified in FIG. 9B includes four display regions, that is, the first to fourth display regions from the upper end to the lower end, similarly to the screen 500A described above. Among these, because the first, second, and fourth display regions are the same as the corresponding display regions in the screen 500A, description thereof will not be repeated here.

The third display region in the screen 500B includes the buttons 5021 to 5023 in common with the screen 500A. Instead of the buttons 5024 to 5027 in the screen 500A described above, the screen 500B includes a button 5040 serving as a conference system cooperation button for instructing cooperation with the paperless conference system 20.

Operation of Data Acquisition Function

Next, with reference to FIG. 3, the following describes an operation of the multifunctional portable terminal 10 when respective buttons other than the buttons 5021 and 5022 arranged in the third display region are operated in the screen 500A serving as the first initial screen and the screen 500B serving as the second initial screen. For example, when detecting an operation performed on the input unit 409 corresponding to the display of the display unit 406, the GUI unit 105 transmits the detection result to the overall control unit 100. The overall control unit 100 causes a function of each unit of the multifunctional portable terminal 10 to be executed corresponding to the detection result received from the GUI unit 105.

First, the following describes a function related to the screen 500A serving as the first initial screen. The following describes an operation when the button 5024 serving as the sound recording button is operated. The sound recording unit 412 is controlled by the voice acquisition unit 101 corresponding to a tap operation on the button 5024, and a voice is started to be acquired. In response to the tap operation on the button 5024, the display of the display unit 406 is changed from the screen 510 of FIG. 10A indicating a sound recording standby state to the screen 520 of FIG. 10B indicating a sound recording state.

In the screen 520, the display of the button 5024 is changed to a button 5024' and the display 5015 is changed to reverse display to indicate the sound recording state. A signal level of the acquired voice is displayed with the level meter 5011. A display region 5201 displays a type of the device used for the sound recording. In this example, the sound recording is performed by using an internal microphone of the multifunctional portable terminal 10. The voice data acquired during the sound recording is transmitted to the data holding unit 109 and stored in the storage 407. The sound table illustrated in FIG. 5E is created in the table holding unit 108, and each value of the record is stored therein. The sound recording can be stopped in response to the tap operation on the button 5024' during the sound recording.

The following describes an operation when the button 5025 serving as the memo button is operated. Processing to be performed is different between the tap operation and the long-press operation on the button 5025. In response to the tap operation on the button 5025, the tag data indicating the time when the tap operation is performed is generated as the memo data. The tag data may hold at least the time information, and for example, empty text data including no content can be utilized. In this case, the time information can utilize a time stamp of the text data file.

In response to the tap operation on the button 5025, the first content acquisition unit 102 acquires date and time when the tap operation is detected. The memo table illustrated in FIG. 5F is created in the table holding unit 108, and each value of the record is stored therein.

For example, as illustrated as the screen 511 of FIG. 11A displayed by the display unit 406, the display 5016 is highlighted for indicating that the memo data is held, and the display region 5013 displays the acquired date and time when the tap operation on the button 5025 is detected and the number of pieces of memo data that are currently held. The first content acquisition unit 102 transmits the tag data including the acquired date and time to the data holding unit 109, and the tag data is stored in the storage 407 as the memo data. When the memo data is stored in the storage 407, as illustrated as the screen 521 of FIG. 11B, the display 5017 is highlighted to indicate that the acquisition of the memo data is completed. In the display of the display unit 406, the screen 521 is displayed for a certain period of time and returned to the screen 511.

FIG. 11A and FIG. 11B illustrate a case in which the button 5025 is tapped in the screen 520 of FIG. 10B during the sound recording. In this way, the multifunctional portable terminal 10 can receive other operations when the sound recording operation is being performed. FIG. 12A to FIG. 15 described later illustrate examples of the screen when functions are sequentially added to the screen in the state of FIG. 11B. Each of the functions illustrated in FIG. 11A to FIG. 15 may also be independently executed.

In response to the long-press operation on the button 5025, processing for creating a memo is performed. When the GUI unit 105 detects the long-press operation on the button 5025, the first content acquisition unit 102 calls a text data creation application that is mounted as standard on the multifunctional portable terminal 10 as illustrated as the screen 512 in FIG. 12A.

The screen 512 includes various keys for inputting characters arranged in a display region 5122, and a text display region 5123 displays characters corresponding to operations of the keys. In response to the tap operation on the button 5120, the memo data based on the input text data is transmitted to the data holding unit 109 and stored in the storage 407. The memo table illustrated in FIG. 5F is created in the table holding unit 108, and each value of the record is stored therein. A file name of the memo data may be the first line of the text data, or may be set according to a predetermined rule.

Figure 12A:
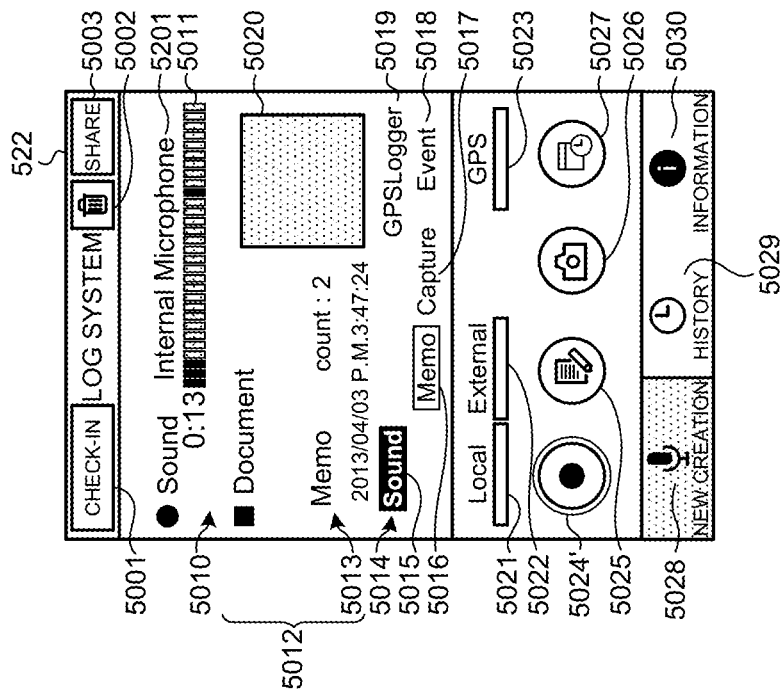
FIGS. 12A and 12B are diagrams illustrating an example of the screen during the recording operation according to the first embodiment.
Figure 12B:
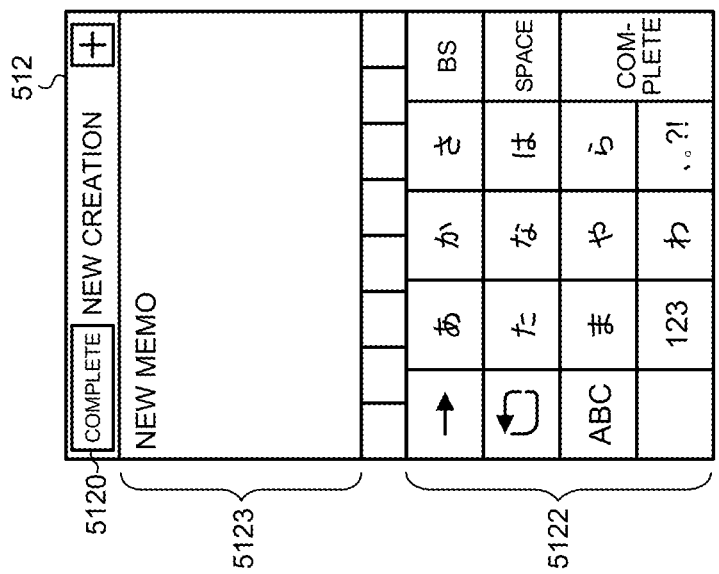

In response to the tap operation on the button 5120, the text data creation application is ended and the display of the display unit 406 is changed to the screen 522 in FIG. 12B. As in FIG. 11B described above, in the screen 522, the display region 5013 displays the date and time when the memo data is held and the number of pieces of memo data that are currently held. The display 5016 is highlighted, for example, to indicate that the memo data is held.

An application for inputting the text data serving as the memo data is not limited to the text data creation application mounted as standard on the multifunctional portable terminal 10. Alternatively, a text data creation application unique to the information processing program according to the first embodiment may be used. The memo data may be created not only by inputting the text data by key input, but also by utilizing handwriting input, that is, touching the touch panel 11 to write characters.

The following describes an operation when the button 5026 serving as the imaging button is operated. When the GUI unit 105 detects the tap operation on the button 5026, the overall control unit 100 calls an imaging application mounted as standard on the multifunctional portable terminal 10 (corresponding to the screen 513 in FIG. 8). The imaging application performs imaging according to a predetermined operation, and the image data is generated. The first content acquisition unit 102 acquires the image data obtained through the imaging, and transmits the image data to the data holding unit 109, for example. The data holding unit 109 stores the transmitted image data in the storage 407. The first content acquisition unit 102 creates the capture table illustrated in FIG. 5D in the table holding unit 108, and stores each value of the record in the table.

Figure 13:
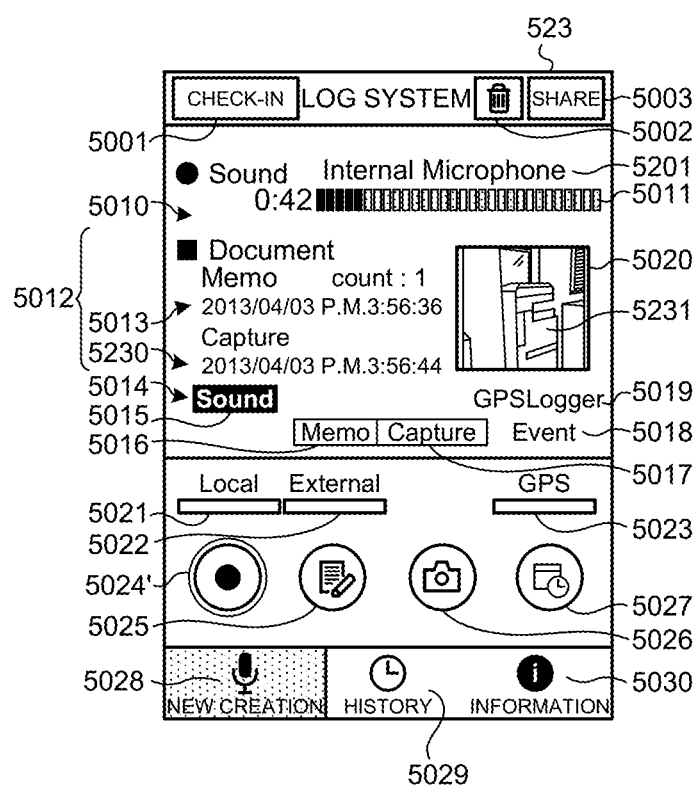
FIG. 13 is a diagram illustrating an example of the screen during the recording operation according to the first embodiment.

When the imaging is completed and the imaging application is ended, the first content acquisition unit 102 causes the GUI unit 105 to display the screen 523 illustrated in FIG. 13. In the screen 523, a display region 5230 displays the date and time when the image data is acquired through the imaging, and a display region 5020 displays an image 5231 based on the image data obtained through the imaging. As the image 5231, a thumbnail image created in advance by converting an image size based on actual image data into a size suitable for the display on the screen 523 is used.

When the multifunctional portable terminal 10 has a recording function for a moving image, moving image data may be acquired by operating the button 5026. In this case, a frame at a predetermined timing in the recorded moving image data may be used as the image 5231.

The following describes an operation when the button 5027 serving as the event registration button is operated. In response to the tap operation on the button 5027, the overall control unit 100 calls a schedule management application (for example, a calendar application) mounted as standard on the multifunctional portable terminal 10.

FIG. 14A illustrates an exemplary screen 514 of the schedule management application. In the screen 514, a title of an event managed as a schedule is input to an input part 5142, and information about a place related to the event is input to an input part 5143. Dates and times when the event is started/ended are input to an input part 5144. An input part to which information such as details of the event is input is arranged at a portion hidden by the display region 5122. This portion can be displayed by swiping or flicking the screen 514 vertically.

The function for causing the hidden portion to be displayed by the swipe operation or the flick operation is similarly applied to other screens.

In response to the tap operation on the button 5141 in the screen 514, the event registration unit 106 transmits, to the data holding unit 109, the information input to each input part in the screen 514 as event information. The data holding unit 109 stores the transmitted event information in the storage 407. The event registration unit 106 creates the event table illustrated in FIG. 5A in the table holding unit 108, and stores each value of the record therein.

The event information is held, for example, as information corresponding to the date input to the input part 5144 of the calendar application mounted as standard on the multifunctional portable terminal 10. In response to the tap operation on the button 5141, the schedule management application is ended and the display of the display unit 406 is changed to the screen 524 in FIG. 14B. In the screen 524, for example, the display 5017 is highlighted to indicate that the event information is transmitted to the data holding unit 109 and stored in the storage 407, and the display 5018 is highlighted to indicate that the event information is registered.

Figure 15:
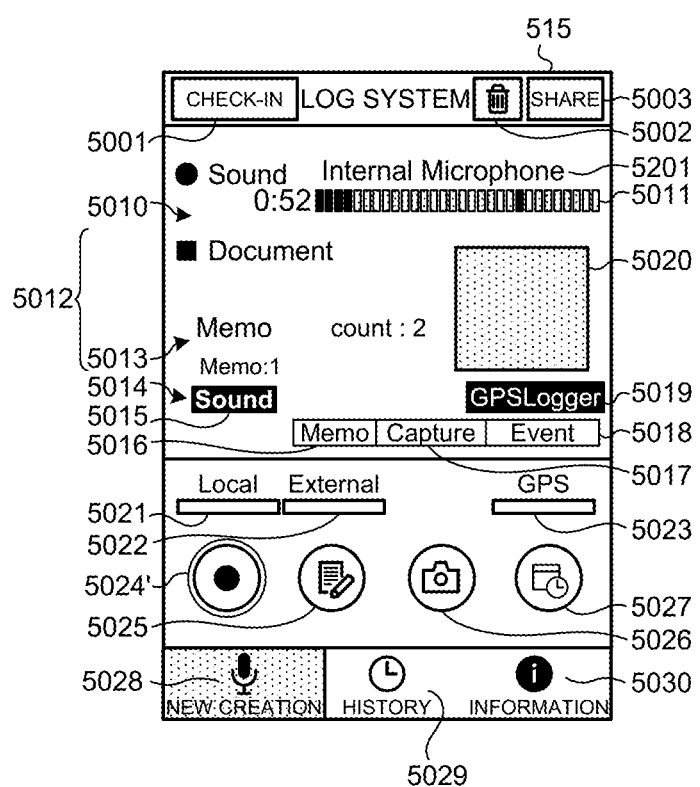
FIG. 15 is a diagram illustrating an example of the screen during the recording operation according to the first embodiment.

The following describes an operation when the button 5023 serving as the GPS log button is operated. In response to the tap operation on the button 5027, the GPS acquisition unit 107 activates the GPS function mounted as standard on the multifunctional portable terminal 10, and causes the GPS receiving unit 415 to start to receive and analyze GPS signals. FIG. 15 illustrates an example of the screen 515 displayed by the display unit 406 when the GPS function is activated in response to the tap operation on the button 5023. The display 5019 is reversely displayed to indicate that the GPS function is turned on.

The positional information analyzed by the GPS receiving unit 415 is transmitted to the data holding unit 109 and stored in the storage 407. The GPS acquisition unit 107 creates the GPS trace table illustrated in FIG. 5B in the table holding unit 108, and stores each value of the record therein.

The execution of the GPS function can be stopped by performing the tap operation on the button 5023 during the execution of the GPS function. It is preferable that the positional information is acquired at predetermined time intervals, such as every ten minutes, during the execution of the GPS function, because storage capacity of the positional information can be saved.

Cooperative Operation with Paperless Conference System

The following describes a function related to the screen 500B serving as the second initial screen. In response to the tap operation on the button 5040 serving as the conference system cooperation button in the screen 500B, the second content acquisition unit 103 acquires information about the conference (such as a title of the conference, and identification information of the conference) held by the paperless conference system terminals 21A and 21B with which own multifunctional portable terminal 10 is currently communicable.

Figure 16B:
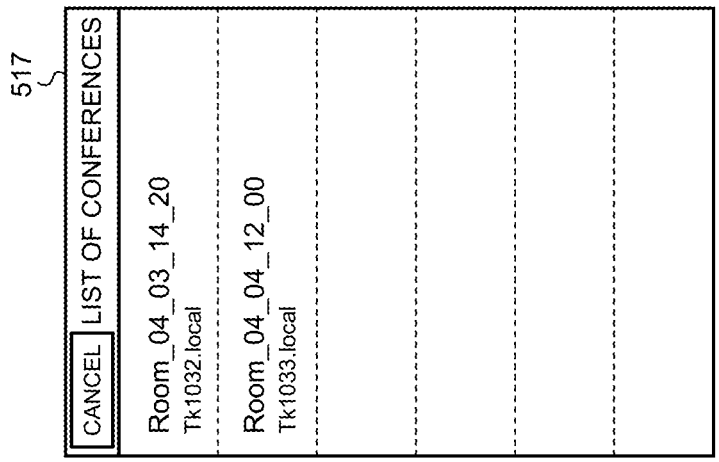
FIGS. 16A and 16B are diagrams illustrating an example of a screen during a cooperative operation with a paperless conference system according to the first embodiment.
Figure 16A:
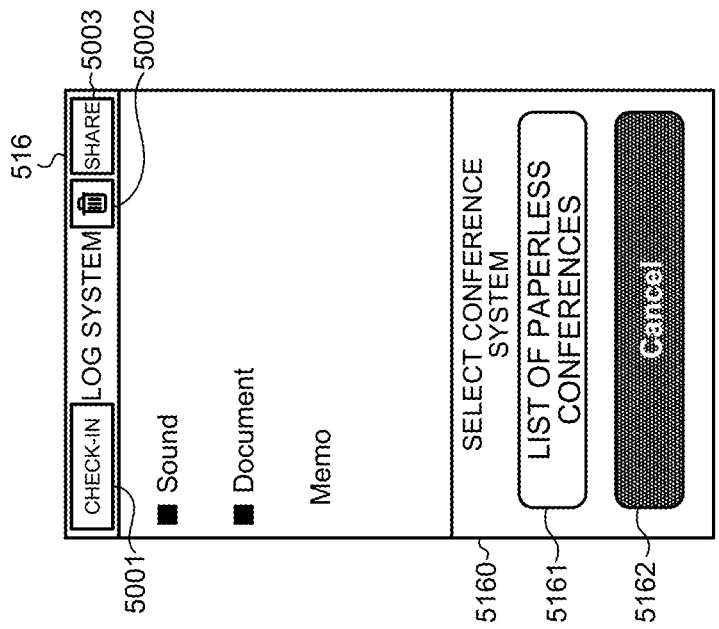

In response to the tap operation on the button 5040, the GUI unit 105 changes the display of the display unit 406 to the screen 516 exemplified in FIG. 16A. In the screen 516, the display region 5160 includes a selection part 5161 for selecting a conference system desired to be cooperated, and a cancel button 5162 for canceling the cooperation with the conference system. By operating the selection part 5161, the display of the display unit 406 is changed to the screen 517 exemplified in FIG. 16B, and pieces of information about the conference acquired by the second content acquisition unit 103, such as a title of the conference, are listed. FIG. 16B illustrates an example in which a conference "Room_04_03_14_20" and a conference "Room_04_04_12_00" are held by the paperless conference system terminals 21A and 21B with which the multifunctional portable terminal 10 is communicable.

Herein, the conference "Room_04_03_14_20" is held by the paperless conference system terminal 21A serving as a master, and the conference "Room_04_04_12_20" is held by the paperless conference system terminal 21B serving as a master. In this case, the paperless conference system terminals 21A and 21B are assumed to hold respective conferences using different terminals serving as a slave. In the screen 517, terminal names of the paperless conference system terminals 21A and 21B (Tk1032.Local and Tk1033.Local) are displayed together with the titles of the conferences.

Figure 17:
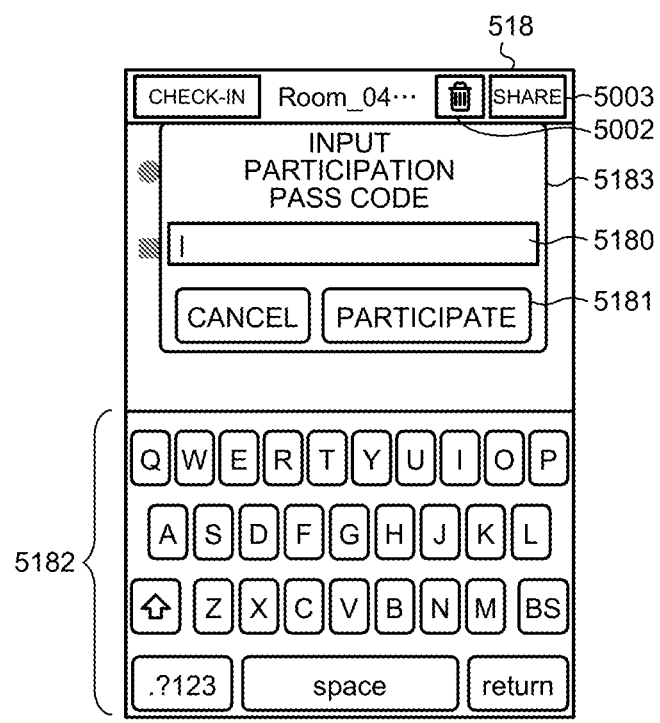
FIG. 17 is a diagram illustrating an example of a screen for inputting a pass code according to the first embodiment.

The user operates the screen 517 to select a desired conference from the listed conferences. Herein, the conference "Room 04_03_14_20" held by the paperless conference system terminal 21A serving as a master is assumed to be selected. When the selected conference requests a pass code, the second content acquisition unit 103 notifies the GUI unit 105 accordingly. In response to the notification, the GUI unit 105 causes the display unit 406 to display the screen 518 for inputting a pass code exemplified in FIG. 17. In the screen 518, a display region 5183 and a key input part 5182 are displayed. The display region 5183 includes a pass code input part 5180 and a participation button 5181. The user operates the key input part 5182 to input a pass code for participating in the selected conference to the pass code input part 5180.

In response to the tap operation on the participation button 5181, the second content acquisition unit 103 transmits the pass code input to the pass code input part 5180 to the paperless conference system terminal 21A serving as a master of the conference "Room 04_03_14_20". When the transmitted pass code is authenticated by the paperless conference system terminal 21A, the paperless conference system terminal 21A transmits a notification of authentication success to the multifunctional portable terminal 10. When receiving the notification of authentication success, the second content acquisition unit 103 establishes cooperation with the conference "Room 04_03_14_20", and requests image data to be browsed in the conference "Room 04_03_14_20" from the paperless conference system terminal 21A.

The second content acquisition unit 103 creates the paperless conference system table illustrated in FIG. 5C in the table holding unit 108, and stores each value of the record therein.

Figure 18:
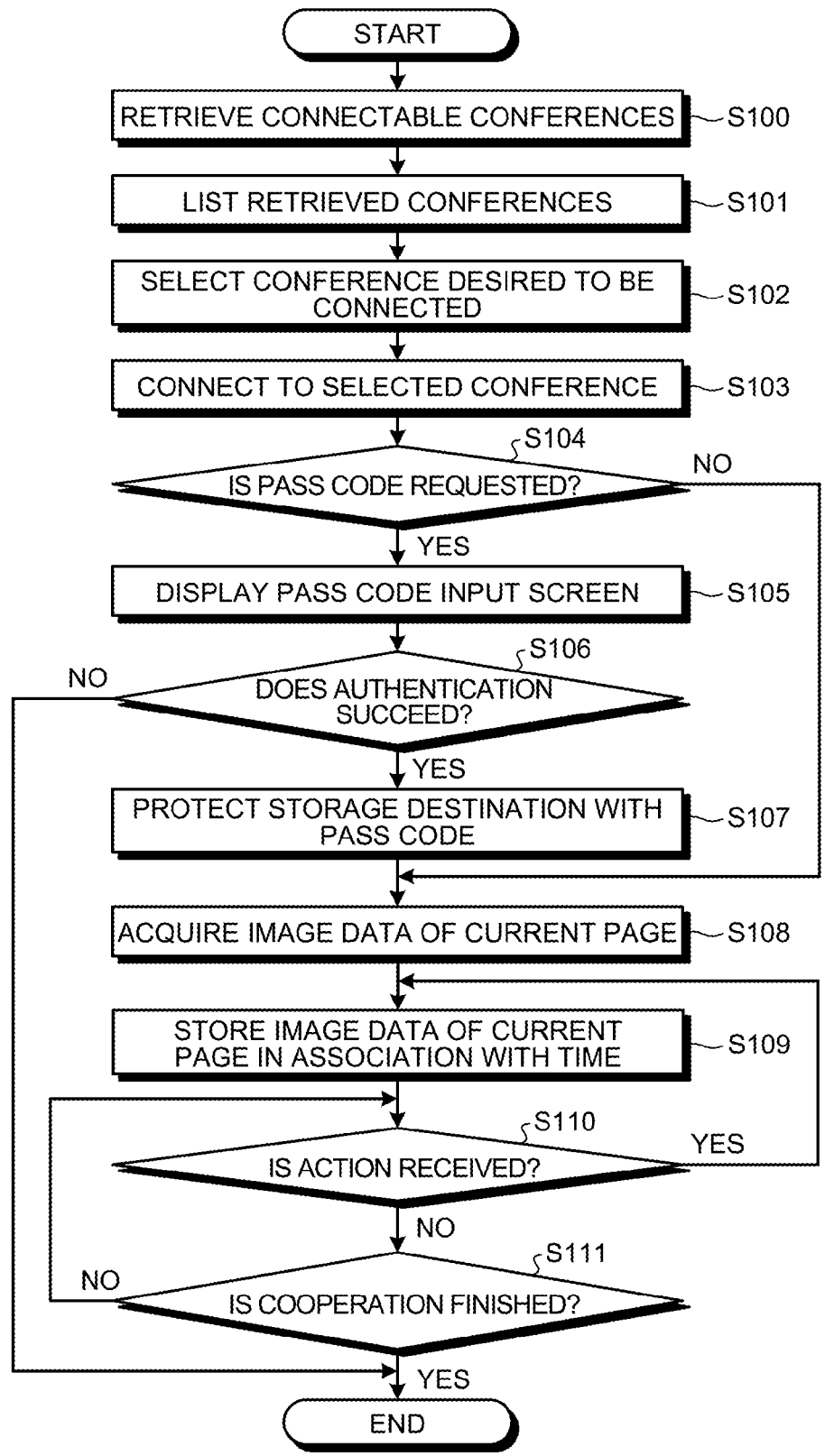
FIG. 18 is a flowchart illustrating an example of conference cooperation processing according to the first embodiment.

FIG. 18 is a flowchart illustrating an example of conference cooperation processing for cooperating with the paperless conference system 20 according to the first embodiment. If the button 5040 is operated in the screen 500B serving as the second initial screen, the second content acquisition unit 103 retrieves connectable conferences at Step S100. The display of the display unit 406 is changed from the screen 500B to the screen 516 of FIG. 16A. In response to the operation on the selection part 5161 by the user, the GUI unit 105 changes the display of the display unit 406 to the screen 517 of FIG. 16B, and displays a list of the connectable conferences retrieved at Step S100 (Step S101).

If the conference desired to be connected is selected through the user operation on the screen 517 (Step S102), the second content acquisition unit 103 is connected to the selected conference at the next Step S103. That is, the second content acquisition unit 103 establishes communication with the paperless conference system terminal 21A serving as a master of the selected conference, for example. In this case, when a pass code is required for causing the paperless conference system 20 to cooperate with the connected multifunctional portable terminal 10, the paperless conference system terminal 21A requests the pass code from the multifunctional portable terminal 10.

At Step S104, the second content acquisition unit 103 determines whether the paperless conference system 20 serving as a connection destination requests the pass code. If it is determined that the pass code is not requested, the second content acquisition unit 103 advances the process to Step S108 described later. If a pass code request is received from the paperless conference system terminal 21A, the second content acquisition unit 103 advances the process to Step S105, and instructs the GUI unit 105 to display the screen 518 for inputting a pass code on the display unit 406.

When the participation button 5181 is operated in the screen 518, the second content acquisition unit 103 transmits the pass code input to the pass code input part S180 to the paperless conference system terminal 21A. The paperless conference system terminal 21A performs authentication processing on the pass code transmitted from the multifunctional portable terminal 10, and transmits the authentication result to the multifunctional portable terminal 10. At Step S106, the second content acquisition unit 103 determines whether the transmitted authentication result indicates authentication success.

If it is determined that the authentication result transmitted from the paperless conference system terminal 21A indicates authentication failure at Step S106, the second content acquisition unit 103 ends a series of processing in the flowchart of FIG. 18. That is, in this case, the user cannot participate in the paperless conference system 20 through the multifunctional portable terminal 10.

If it is determined that the authentication result transmitted from the paperless conference system terminal 21A indicates authentication success at Step S106, the second content acquisition unit 103 advances the process to Step S107. At Step S107, the second content acquisition unit 103 protects a storage destination (for example, a certain folder in the storage 407) of the data acquired through cooperation with the paperless conference system 20 using the pass code input at Step S105 described above. For example, the folder itself and each file stored in the folder are encrypted using the pass code as a key.

The process proceeds to Step S108, and the second content acquisition unit 103 acquires, from the paperless conference system terminal 21A, image data of the page currently displayed on the paperless conference system terminal 21A. At the next Step S109, the second content acquisition unit 103 transmits the image data acquired at Step S108 to the data holding unit 109 in association with time information indicating the time when the image data is acquired, and stores the image data in the storage 407.

Figure 19:
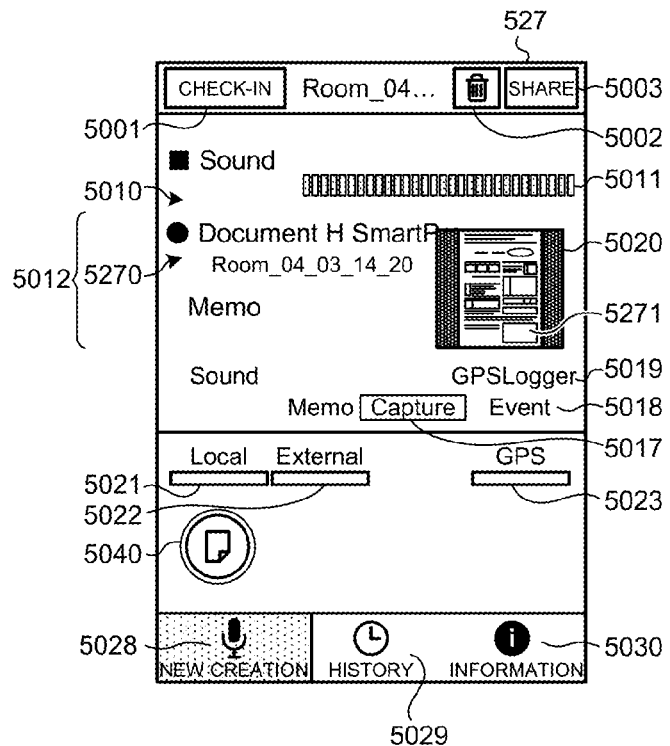
FIG. 19 is a diagram illustrating an example of display of image data of an image currently displayed on the paperless conference system terminal according to the first embodiment.

At Step S109, the second content acquisition unit 103 causes the display unit 406 to display the acquired image data. FIG. 19 is a diagram illustrating an example in which the display unit 406 displays the image data of the image currently displayed on the paperless conference system terminal 21A. In the screen 527 exemplified in FIG. 19, the display region 5020 displays an image 5271, which is a thumbnail image obtained by reducing the image data acquired from the paperless conference system terminal 21A. The display 5017 is highlighted, for example, to indicate that the image data is acquired from the paperless conference system 20. In the screen 527, the display region 5270 displays the title of the cooperating conference.

At the next Step S110, the second content acquisition unit 103 determines whether information indicating an action taken on the page is received from the paperless conference system terminal 21A. For example, when an operation of turning a page, such as a swipe operation, is performed on the paperless conference system terminal 21A, the paperless conference system terminal 21A transmits information indicating the operation of turning a page to the other terminal of the paperless conference system 20, and also transmits the information to the cooperating multifunctional portable terminal 10.

If the information indicating the action taken on the page is received from the paperless conference system terminal 21A, the second content acquisition unit 103 returns the processing to Step S109, transmits, to the data holding unit 109, the image data of the page currently displayed on the paperless conference system terminal 21A as a result of the action in association with the time when the action is received, and stores the image data in the storage 407. Subsequently, the second content acquisition unit 103 determines whether there is a following action at Step S110.

If it is determined that the information indicating the action is not received at Step S110, the second content acquisition unit 103 advances the processing to Step S111. At Step S111, the second content acquisition unit 103 determines whether to end the cooperation with the paperless conference system 20. If it is determined that the cooperation is not ended, the second content acquisition unit 103 returns the processing to Step S110, and waits for the next action. If it is determined that the cooperation is ended, the second content acquisition unit 103 ends a series of processing in the flowchart of FIG. 18.

For example, the cooperation with the paperless conference system 20 is ended by operating the button 5040 serving as the conference system cooperation button in the screen 527 during the cooperation with the paperless conference system 20. The cooperation with the paperless conference system 20 can also be ended by executing check-in by operating the button 5001 serving as the check-in button of which operation will be described later.

Figure 20:
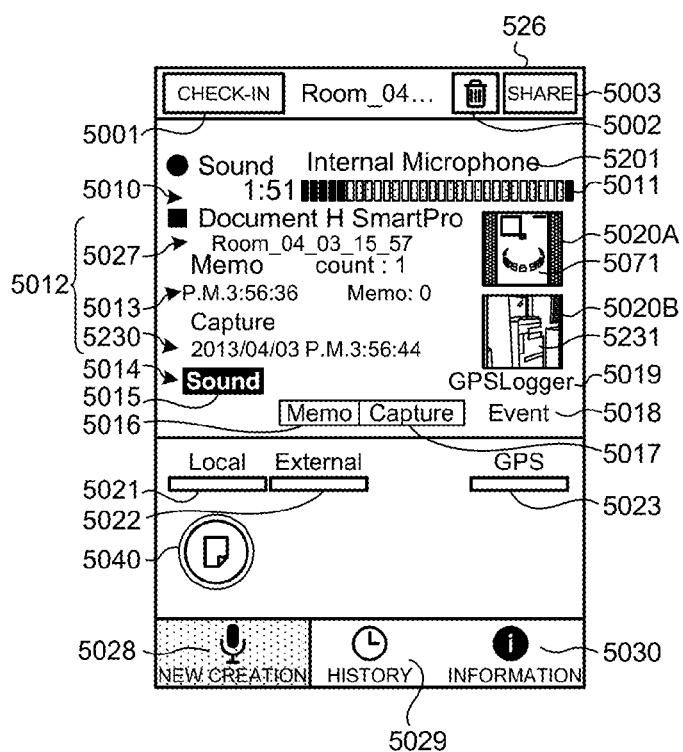
FIG. 20 is a diagram illustrating an example of display when cooperation with the paperless conference system is performed at the same time as other function according to the first embodiment.

The cooperation with the paperless conference system 20 can be performed at the same time as the other function of the multifunctional portable terminal 10. FIG. 20 is a diagram illustrating an example of the display of the display unit 406 when the cooperation with the paperless conference system 20 is performed at the same time as the other function. In FIG. 20, the screen 526 is an example of a case in which the memo data and the image data are registered, and the cooperation with the paperless conference system 20 is performed while performing the sound recording processing described above.

In the screen 526, the display 5015 is changed to the reverse display to indicate the sound recording state, and the displays 5016 and 5017 are highlighted to indicate that the memo data and the image data are acquired. The display region 5020B displays the image 5231 based on the acquired image data. The display region 5270 displays the title of the cooperating conference, and a display region 5020A displays an image 5071 obtained by reducing the image currently displayed on the paperless conference system terminal 21A used for the cooperating conference.

Data Operation

Next, the following describes a data operation. The data operation is performed by operating any one of the button 5001 serving as the check-in button, the button 5002 serving as the delete button, and the button 5003 serving as the share button that are arranged in the first display region of each of the screens described above, as well as the button 5028 serving as the new creation button and the button 5029 serving as the history button that are arranged in the fourth display region thereof.

The following describes an operation when the button 5001 serving as the check-in button is operated. In response to the tap operation on the button 5001, the overall control unit 100 collectively stores, as the log information, pieces of data held after the operation of the button 5028 serving as the new creation button. For example, in response to the operation of the button 5001, the overall control unit 100 registers the log information in a predetermined system. The operation of registering the log information in the predetermined system is referred to as the check-in operation.

Figure 21B:
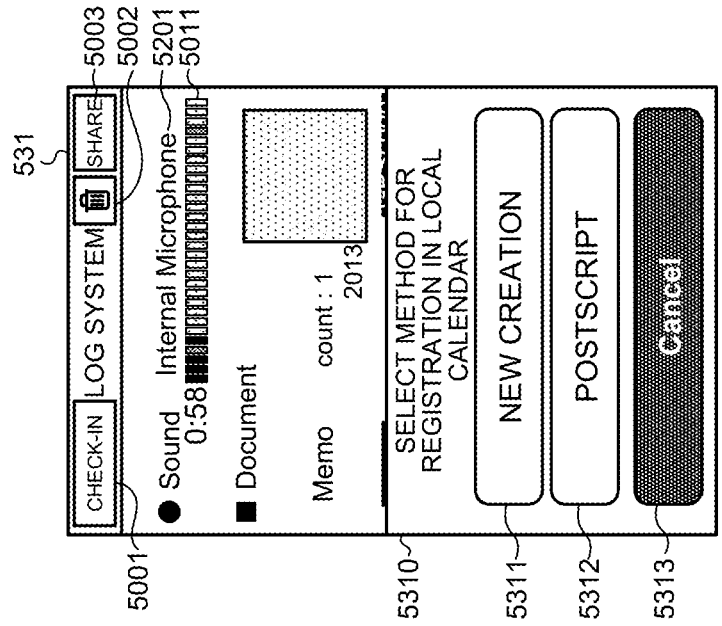
FIGS. 21A and 21B are diagrams illustrating an example of display at the time of check-in according to the first embodiment.
Figure 21A:
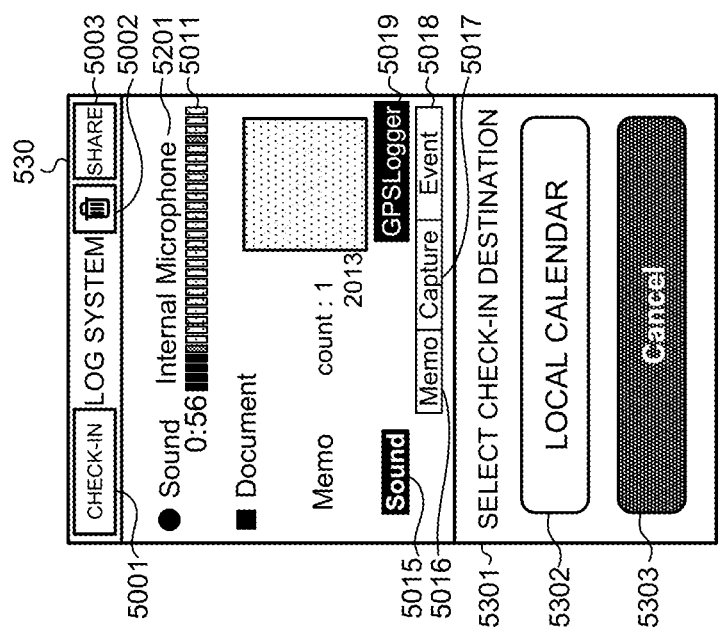

In the first embodiment, through the check-in operation, the log information is registered in the calendar application (local calendar) mounted as standard on the multifunctional portable terminal 10 in association with date information. FIGS. 21A and 21B are diagrams illustrating an example of the display of the display unit 406 at the time of the check-in operation. In response to the tap operation on the button 5001, the GUI unit 105 causes the display unit 406 to display the screen 530 exemplified in FIG. 21A. In the example of FIG. 21A, the display region 5301 includes a button 5302 for designating a check-in destination and a cancel button 5303 for canceling the check-in operation. As the check-in destination, for example, the local calendar can be designated.

When the button 5302 is operated to designate the local calendar in the screen 530, the GUI unit 105 changes the display of the display unit 406 from the screen 530 to the screen 531 in FIG. 21B. In the screen 531, a display region 5310 includes buttons 5311, 5312, and 5313. The button 5311 is a button for creating a new event on the local calendar and registering the log information in the created event. The button 5312 is a button for adding the log information to the event that is already registered in the local calendar. The button 5313 is a button for canceling the registration of the log information.

The log information is registered in response to the tap operation on the button 5311 or 5312. By way of example, the overall control unit 100 accesses the local calendar in response to the tap operation on the button 5311 or 5312. The overall control unit 100 refers to the meeting list table (refer to FIG. 4) created at the time when the button 5028 serving as the new creation button is lastly operated in the table holding unit 108, and stores the time when the button 5028 is operated as the end time in the meeting list table. The overall control unit 100 associates the identification information (for example, the meeting ID) of the meeting list table with one event and registers the log information. In this case, the overall control unit 100 can use the title, the start time, and the end time in the meeting list table as the title, the start time, and the end time of the event to register the log information in the local calendar.

The following describes an operation when the button 5029 serving as the history button is operated. In response to the tap operation on the button 5029, the overall control unit 100 accesses the local calendar to acquire the registered event. The GUI unit 105 causes the display unit 406 to list the acquired events. The overall control unit 100 may narrow down the acquired events according to predetermined conditions such as a date or a title.

Figure 22:
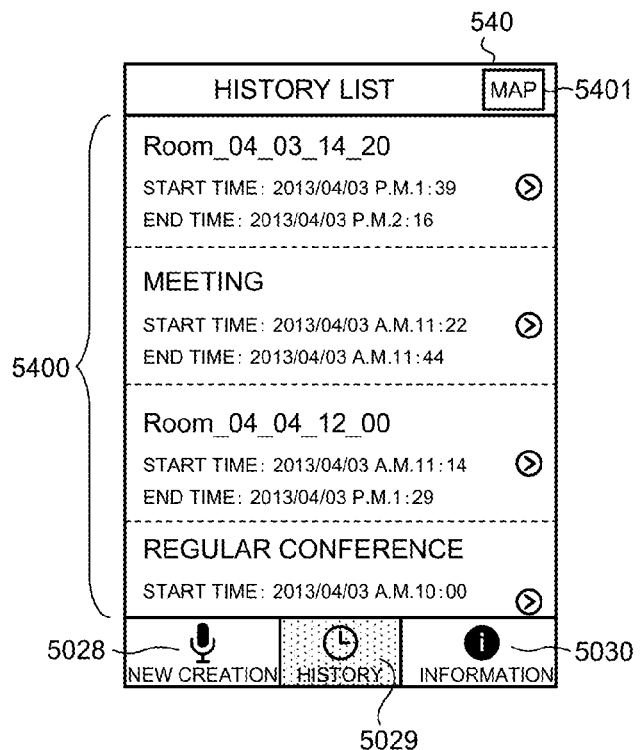
FIG. 22 is a diagram illustrating an example of a screen listing pieces of event information.

FIG. 22 is a diagram illustrating an example of the screen 540 listing the pieces of event information displayed on the display unit 406. In the screen 540 of the example illustrated in FIG. 22, a display region 5400 displays a list of pieces of event information. In this example, the display region 5400 displays the title, the start time, and the end time of each event as the pieces of event information.

The user performs the tap operation on a position of the display region 5400 corresponding to a desired piece of event information. Accordingly, the user can designate the log information associated with the event information corresponding to the position on which the tap operation is performed. In response to the tap operation, the overall control unit 100 reads the event information selected from the local calendar serving as the check-in destination, and acquires the meeting list table corresponding to the log information associated with the read event information from the table holding unit 108. The overall control unit 100 further acquires each table associated with the acquired meeting list table using the meeting ID from the table holding unit 108. Based on the acquired information about each table, the overall control unit 100 generates display control information that causes the display unit 406 to display a history reproduction screen described later, and transmits the information to the GUI unit 105.

In the screen 540, a button 5401 is a button for displaying map information. By way of example, in response to the tap operation on the button 5401, the overall control unit 100 acquires the latest latitude and longitude information from each GPS trace table associated with each piece of the history information displayed in the display region 5400 via the meeting list table. The overall control unit 100 calls a map display application mounted on the multifunctional portable terminal 10 to display the map, using the acquired latitude and longitude information and the meeting ID associated with each piece of the latitude and longitude information as parameters. The user can refer to the map to select desired history information.

In a case in which a paperless conference system table of which pass code is "required" is associated with the meeting list table acquired by selecting each piece of the history information displayed in the display region 5400, the storage destination of the data acquired from the conference of the paperless conference system 20 illustrated in the paperless conference system table is encrypted by the pass code. According to the control of the GUI unit 105 by the overall control unit 100, the display unit 406 displays the screen 541 for inputting the pass code exemplified in FIG. 23.

Figure 23:
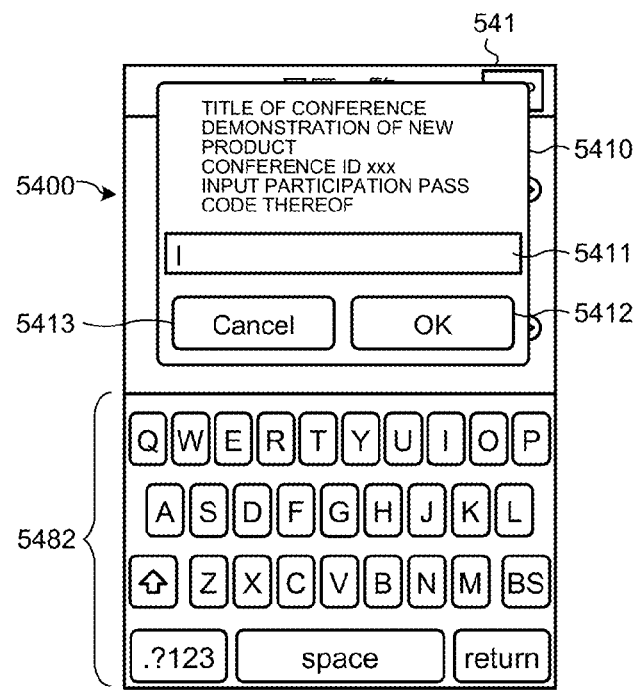
FIG. 23 is a diagram illustrating an example of a screen for inputting a pass code according to the first embodiment.

In the screen 541 illustrated in FIG. 23, a display region 5410 and a key input part 5482 are displayed. The display region 5410 includes a pass code input part 5411, an OK button 5412, and a cancel button 5413. The user operates the key input part 5482 to input, to the pass code input part 5411, the pass code corresponding to the conference of the paperless conference system 20 associated with the selected history information. For example, the overall control unit 100 attempts to decode the encryption applied to the storage destination of the data acquired from the conference using the input pass code. If the decoding succeeds, the overall control unit 100 generates the display control information for displaying the history reproduction screen described later, and transmits the information to the GUI unit 105. If the decoding fails, the overall control unit 100 causes the pass code input part 5411 to be displayed again, and prompts the user to input a correct pass code.

The input processing of the pass code in the screen 541 is canceled by operating the cancel button 5413. The overall control unit 100 changes, for example, the display of the display unit 406 to the screen 540 of FIG. 22 described above, and prompts the user to select the history information.

The following describes an operation when the button 5003 serving as the share button is operated. The multifunctional portable terminal 10 according to the first embodiment (referred to as a first multifunctional portable terminal 10) can perform data communication with the other multifunctional portable terminal 10 (referred to as a second multifunctional portable terminal 10) using communication via the data I/F 408, for example. The first multifunctional portable terminal 10 and the second multifunctional portable terminal 10 can share the log information through the data communication.

By way of example, assuming that the data I/F 408 performs wireless communication using Bluetooth (registered trademark), the following describes a share of the log information between a plurality of multifunctional portable terminals 10. In the first multifunctional portable terminal 10, in response to the tap operation on the button 5003, the overall control unit 100 searches for a communicable second multifunctional portable terminal 10 through the communication via the data I/F 408. When the communicable second multifunctional portable terminal 10 is found, the first multifunctional portable terminal 10 establishes communication with the found second multifunctional portable terminal 10 using the data I/F 408.

In the first multifunctional portable terminal 10, the overall control unit 100 inquires, for example, of the second multifunctional portable terminal 10 whether the information processing program according to the first embodiment is mounted thereon through the communication with the second multifunctional portable terminal 10. If the first multifunctional portable terminal 10 obtains a response showing that the information processing program is not mounted on the second multifunctional portable terminal 10, the first multifunctional portable terminal 10 ends the communication with the second multifunctional portable terminal 10 using the data I/F 408, for example.

If the first multifunctional portable terminal 10 obtains a response showing that the information processing program is mounted on the second multifunctional portable terminal 10, the first multifunctional portable terminal 10 acquires, from the second multifunctional portable terminal 10, the identification information for identifying the second multifunctional portable terminal 10. That is, the first multifunctional portable terminal 10 can share the log information with the second multifunctional portable terminal 10 identified by the identification information acquired herein. In the first multifunctional portable terminal 10, the overall control unit 100 controls the GUI unit 105 to cause the display unit 406 to display a list of pieces of the acquired identification information.

Figure 24B:
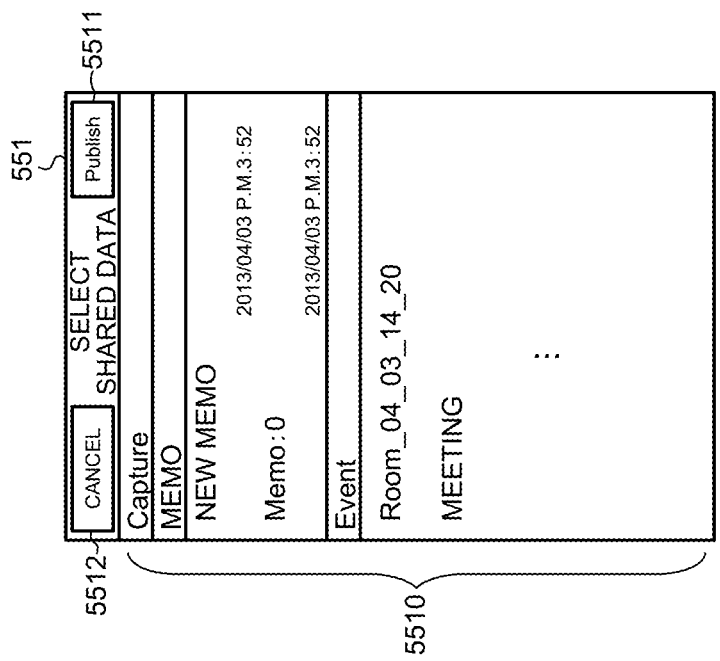
FIGS. 24A and 24B are diagrams illustrating an example of a screen for sharing log information according to the first embodiment.
Figure 24A:
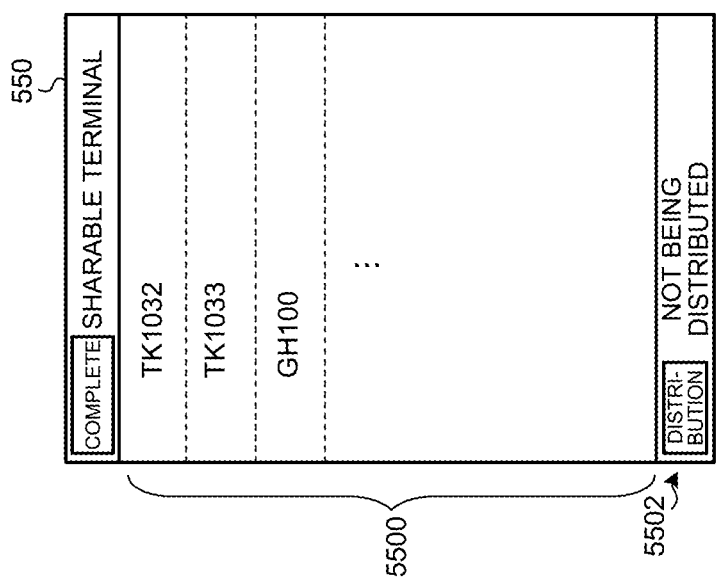

FIG. 24A illustrates an example of the screen 550 for displaying a list of the second multifunctional portable terminals 10 that can share the log information. In the screen 550, a display region 5500 lists the pieces of identification information of the second multifunctional portable terminals 10 that can share the log information. When the user selects the identification information of the second multifunctional portable terminal 10 desired to share the log information from the display of the display region 5500 and performs the tap operation on a button 5502 indicating distribution, the display of the display unit 406 is changed from the screen 550 to the screen 551 for selecting data desired to be shared exemplified in FIG. 24B.

In the screen 551 of FIG. 24B, the display region 5510 lists pieces of sharable data held by the first multifunctional portable terminal 10. When the user selects a piece of data desired to be shared by the terminal at the other end (second multifunctional portable terminal 10) from the pieces of data listed in the display region 5510 and taps a button 5511 indicating publishing in the screen 551, the selected pieces of data are transmitted to the second multifunctional portable terminal 10 and the log information is shared.

Figure 25B:
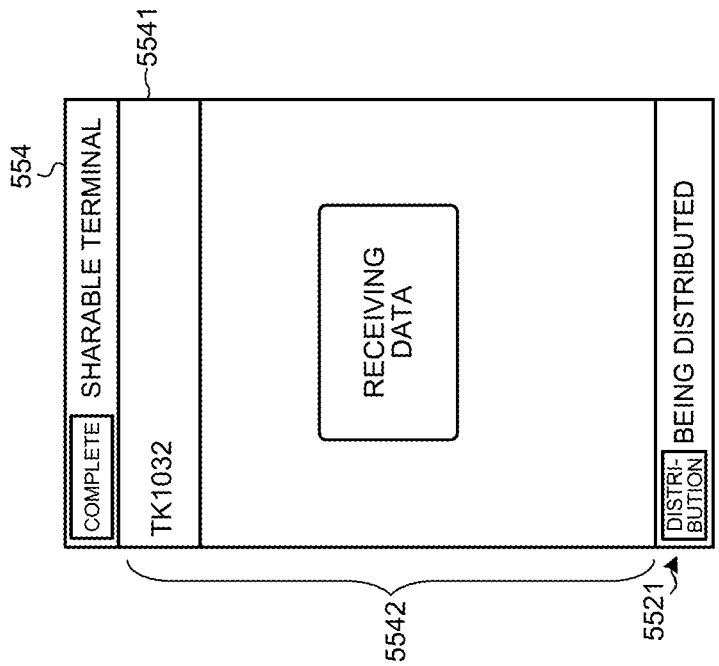
FIGS. 25A and 25B are diagrams illustrating an example of a screen for sharing the log information according to the first embodiment.
Figure 25A:
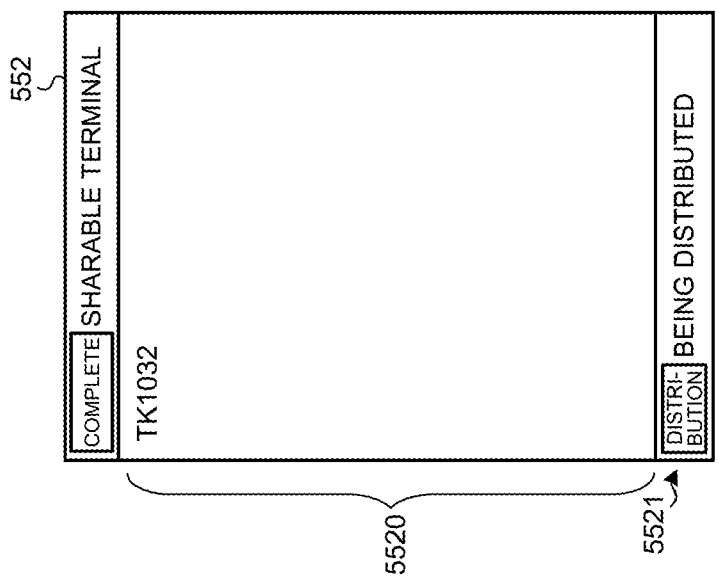

The screen 552 exemplified in FIG. 25A is an example of the display of the display unit 406 in the second multifunctional portable terminal 10 in sharing the log information. In the screen 552, a display region 5520 displays identification information of the terminal at the other end sharing the log information (first multifunctional portable terminal 10). A display region 5521 indicates whether the log information is started to be transmitted. When the second multifunctional portable terminal 10 starts to receive the data, the display of the display unit 406 is changed to the display of the screen 554 in FIG. 25B, a display region 5541 displays the identification information of the terminal at the other end, and a display region 5542 displays the fact that the data is being received.

If the paperless conference system table of which pass code is "required" is associated with the meeting list table corresponding to the log information to be shared, the screen 553 for inputting a pass code (refer to FIG. 8) is displayed immediately after the display of the screen 552. Because the configuration of the screen 553 is similar to that of the screen 541 described above, description thereof will not be repeated here. The screen 553 may be displayed at the time when the data desired to be shared is selected in the screen 551 described above, not only immediately after the display of the screen 552.

The second multifunctional portable terminal 10 merges the data transmitted from the first multifunctional portable terminal 10 with the data held by the second multifunctional portable terminal 10. The second multifunctional portable terminal 10, for example, stores the data transmitted from the first multifunctional portable terminal 10 in the storage 407 using the data holding unit 109, and stores the attribute information of the data in the record of the table corresponding to the data held in the table holding unit 108.

In response to the tap operation on the button 5512 indicating canceling in the screen 551, the share of the log information with the second multifunctional portable terminal 10 is stopped.

In the above example, the first multifunctional portable terminal 10 transmits the data to the second multifunctional portable terminal 10 to share the log information between the first multifunctional portable terminal 10 and the second multifunctional portable terminal 10. However, the embodiment is not limited thereto. That is, the second multifunctional portable terminal 10 may transmits the log information to be shared to the first multifunctional portable terminal 10.

The following describes an operation when the button 5002 serving as the delete button is operated. In response to the tap operation on the button 5002, the overall control unit 100 controls the GUI unit 105 to cause the display unit 406 to display the screen 560 for deleting the log information exemplified in FIG. 26.

Figure 26:
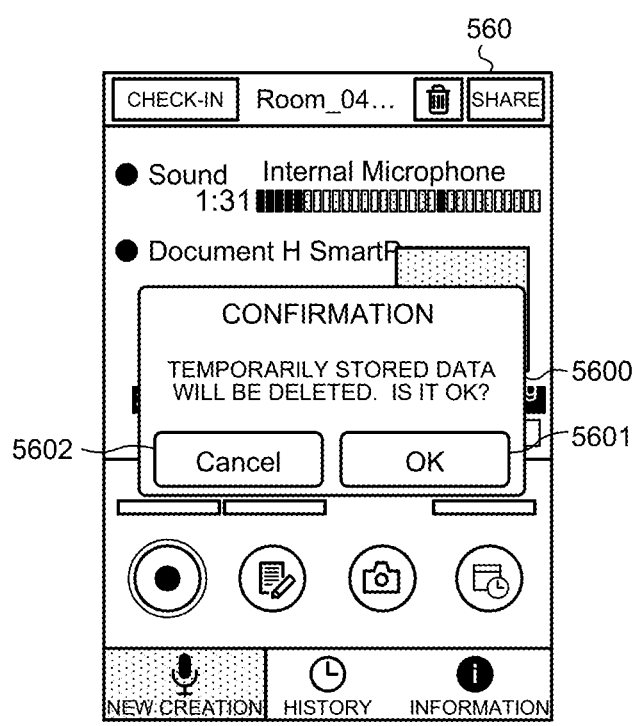
FIG. 26 is a diagram illustrating an example of a screen for deleting the log information according to the first embodiment.

In the screen 560 of FIG. 26, a display region 5600 displays a message for prompting the user to confirm whether to delete the log information, and includes a delete button 5601 and a cancel button 5602. In response to the tap operation on the delete button 5601, the overall control unit 100 deletes the log information that is being recorded. In response to the tap operation on the delete button 5601, for example, the overall control unit 100 deletes, from the storage 407, the tables including the meeting list table illustrated in FIG. 4 and FIGS. 5A to 5C that are created by the table holding unit 108 and held in the storage 407.

In this case, the overall control unit 100 can leave the pieces of data stored in the storage 407 by the data holding unit 109 without deleting. The embodiment is not limited thereto, and the overall control unit 100 may delete the pieces of data stored in the storage 407 by the data holding unit 109.

In the screen 560, the cancel button 5602 is used for canceling the deletion of the log information.

Browsing of Log Information

Next, the following describes an operation for browsing the registered history information. As described above, in response to the tap operation on the button 5029 serving as the history button, the display unit 406 displays the screen 540 illustrated in FIG. 22. When a desired piece of event information is selected from the list of pieces of event information displayed in the display region 5400 of the screen 540, the overall control unit 100 acquires the meeting list table associated with the log information corresponding to the selected event information from the table holding unit 108. The overall control unit 100 also acquires each table associated with the meeting list table from the table holding unit 108.

Based on the information stored in each of the tables including the meeting list table acquired from the table holding unit 108, the overall control unit 100 acquires first content data and second content data that are associated with each table and held in the data holding unit 109. Based on the information stored in each table, the first content data, and the second content data that are acquired, the overall control unit 100 controls the GUI unit 105 to cause the display unit 406 to display a log information browsing screen.

The following describes the log information browsing screen with reference to FIG. 27A to FIG. 32B. Display control of each screen exemplified in FIG. 27A to FIG. 32B is performed by the overall control unit 100 and the GUI unit 105 illustrated in FIG. 6 controlled by the overall control unit 100.

The following describes a basic configuration example of the log information browsing screen with reference to FIGS. 27A and 27B. As exemplified in FIG. 27A, a display region at the upper end of a log information browsing screen 600 corresponds to the first display region of the screen 500A described above, for example. In the log information browsing screen 600, the display region includes a button 6001 for returning to the screen 540 described above that is the preceding screen and a button 6002 for calling the map display application. The display region also includes a display 6003 indicating the log information currently displayed on the log information browsing screen 600.

A display region at the lower end of the log information browsing screen 600 corresponds to the fourth display region of the screen 500A described above, for example, and includes the button 5028 serving as the new creation button, the button 5029 serving as the history button, and the button 5030 serving as an information button.

In the log information browsing screen 600, a central display region occupying a large part of the screen is a detailed log information display region 601, in which the first content and the second content associated with the log information are arranged along the time axis. In the detailed log information display region 601, the display indicating a time range in which a voice is recorded is arranged along the time axis, and a component for controlling reproduction of the voice is arranged at a position on the time axis corresponding to the time when the voice is recorded.

The following describes the detailed log information display region 601 in more detail. In this example, in the detailed log information display region 601, the time axis is defined so that the time elapses from the top to the bottom of the screen. The embodiment is not limited thereto. Alternatively, the time axis may be defined so that the time elapses from the bottom to the top of the screen, or may be defined so that the time elapses in the horizontal direction of the screen.

In the detailed log information display region 601, a position in the vertical direction of the region is associated with the time on the time axis. The minimum value of the time on the time axis is the start time in the meeting list table illustrated in FIG. 4, and the maximum value is the end time therein. Each piece of data associated with the log information is arranged on the time axis according to the time information associated with each piece of data. In the detailed log information display region 601, a display length in the vertical direction of the region is associated with a time length illustrated in the time axis, and the scale of the time axis can be enlarged and reduced by changing the display length per unit time.

More specifically, by performing a pinch-in operation on the display of the detailed log information display region 601, the scale of the time axis is reduced and the time displayed by unit length is increased. By performing a pinch-out operation on the display of the detailed log information display region 601, the scale of the time axis is enlarged and the time displayed by unit length is reduced. In this case, resolution of the time in the display is increased, so that each piece of data can be identified by a finer time unit.

A time bar 6010 indicating the time axis is arranged in the detailed log information display region 601. The virtual upper end of the time bar 6010 corresponds to the start time in the meeting list table, and the virtual lower end thereof corresponds to the end time. Actually, a range corresponding to the scale of the time axis in the detailed log information display region 601 is cut out from the range from the virtual upper end to the virtual lower end of the time bar 6010 and displayed in the detailed log information display region 601.

On the time bar 6010, a display indicating a piece of data that has continuous time information among the pieces of data associated with the log information is arranged at a position corresponding to the time when the data is acquired. Examples of the piece of data that has continuous time information include voice data, and a range corresponding to the start time and the end time in the sound table of FIG. 5E is indicated on the time bar 6010. In FIG. 27A to FIG. 34, the time period in which the voice data exists is represented by the hatched area on the time bar 6010.

The detailed log information display region 601 is divided into left and right display regions, not overlapping with each other, by the time bar 6010 to generate a divided region 6011A on the left side of the time bar 6010 and a divided region 6011B on the right side thereof. In the first embodiment, the first content that is generated inside of the multifunctional portable terminal 10 and indicated with one time is arranged in one of the divided regions 6011A and 6011B, and the second content acquired from an external device is arranged in the other thereof. Herein, it is assumed that the left divided region 6011A is the second content display region in which the second content is arranged, and the right divided region 6011B is the first content display region in which the first content is arranged.

In the example of FIG. 27A, a reduced image (thumbnail image) based on the image acquired from the paperless conference system 20 is arranged in the left divided region 6011A as second content 6014 at a position corresponding to the time when the image is acquired. Reduced images of a plurality of images imaged by the imaging unit 411 included in the multifunctional portable terminal 10 are arranged in the right divided region 6011B as pieces of first content $6015_1$ and $6015_2$ at positions, each corresponding to the time when the corresponding image is acquired.

The second content 6014 is displayed at a position corresponding to the time when page operation information for displaying the corresponding image is acquired.

In this way, the display region that displays the first content and the display region that displays the second content are clearly separated, so that the pieces of data collected by the user as a memorandum using the multifunctional portable terminal 10 can be easily discriminated from the data used in common in a conference and the like. The left and right divided regions 6011A and 6011B divided by the time bar 6010 share the time axis with each other, so that relation among the pieces of data arranged in the divided regions 6011A and 6011B can be easily grasped.

Herein, the divided region 6011A displays time information 6017 indicating each time corresponding to the time axis at predetermined intervals. The time information 6017 may be displayed in the divided region 6011B.

A triangular display 6016 displayed at an left upper end of each of the pieces of first content $6015_1$ and $6015_2$ indicates an acquisition time of the corresponding content in detail with the tip thereof. In the example of FIG. 27A, three triangular displays 6016 are displayed for the first content $6015_2$. Accordingly, it is found that the display of the first content $6015_2$ includes other hidden pieces of first content acquired at the time close to the acquisition time of the first content $6015_2$.

In FIG. 27A, the time bar 6010 has a reproduction controller 6012 arranged thereon that is a component for controlling the reproduction of the voice data. In this example, the central part of the reproduction controller 6012 displays an icon indicating a control that can be currently applied to the voice data. FIG. 27A illustrates an example in which the voice data is being reproduced, and a display indicating that the reproduction can be stopped (two short vertical bars) is displayed on the reproduction controller 6012. FIG. 27B illustrates an example in which the reproduction of the voice data is stopped, and a display indicating that the reproduction can be started (a triangle facing right) is displayed on the reproduction controller 6012.

The reproduction controller 6012 moves along the time bar 6010 according to a lapse of time corresponding to the reproduction of the voice data. On the left side of the reproduction controller 6012, a reproduction time display 6013 is displayed indicating the time on the time axis corresponding to the position of the reproduction controller 6012. By performing a swipe operation or a flick operation on the reproduction controller 6012 in a direction along the time axis, the display of the reproduction controller 6012 is vertically moved on the time bar 6010. Accordingly, the voice data can be reproduced from a desired time.

Even at a position on the time bar 6010 in a time period where the voice data does not exists, the reproduction controller 6012 moves on the time bar 6010 according to a lapse of time similarly to a case in which the voice data is being reproduced. Accordingly, even when there is no voice data in some time period, the user can continue to reproduce the voice data as if the voice data continuously exists.

FIGS. 28A to 28C illustrate an example of enlarging the scale of the time axis. That is, by performing the pinch-out operation in the vertical direction in the detailed log information display region 601 of the log information browsing screen 600, the scale of the time axis is enlarged corresponding to an operation width. That is, when the pinch-out operation is performed in the vertical direction in the state illustrated in FIG. 28A, the scale of the time axis is enlarged to be the state exemplified in FIG. 28B. More specifically, focusing on the display of the time information 6017 such as "p.m. 1:17" and "p.m. 1:18", it is found that the scale of the time axis in FIG. 28B is enlarged by substantially three times that in FIG. 28A.

As the scale of the time axis is enlarged, pieces of data acquired at times close to each other are separated to be displayed. For example, in FIG. 28A, pieces of first content $6015_{11}$ and $6015_{12}$ are displayed overlapping with each other. It is found that an additional piece of first content is hidden because there is a triangular display at the left end of the pieces of first content $6015_{11}$ and $6015_{12}$.

In contrast, in FIG. 28B of which scale of the time axis is enlarged, the pieces of first content $6015_{11}$ and $6015_{12}$ are separated to be displayed, and first content $6015_{13}$ hidden in the example of FIG. 28A is further separated to be displayed.

In the example of FIG. 28B, the first content $6015_{12}$ extends downwardly off the detailed log information display region 601, that is, in the time passing direction. In this case, by performing the swipe operation or the flick operation upwardly in the detailed log information display region 601 of the log information browsing screen 600, the time indicated by the time axis displayed in the detailed log information display region 601 is shifted to the time passing direction. Accordingly, as exemplified in FIG. 28C, the entire first content $6015_{12}$, part of which has extended off in the time passing direction, is displayed in the detailed log information display region 601.

In the example of FIG. 28C, the scale of the time axis is reduced by the pinch-in operation performed on the screen illustrated in FIG. 28B.

In the state of FIGS. 28A to 28C, when the tap operation is performed on each of the pieces of first content $6015_{11}$ to $6015_{13}$, the content of the piece of first content on which the tap operation is performed can be displayed. For example, when the tap operation is performed on the first content $6015_{13}$ that is memo data based on text data, the text data is displayed on the log information browsing screen 600. When the tap operation is performed on the first content $6015_{12}$ that is image data, the image data is enlarged to be displayed on the log information browsing screen 600.

The time bar 6010 can be moved to the left or the right in response to the swipe operation or the flick operation in the left or right direction with respect to the time bar 6010. As the time bar 6010 is moved to the left or the right, a ratio between the width of the divided region 6011A and the width of the divided region 6011B is changed. FIGS. 29A to 29C illustrate an example in which the time bar 6010 is moved to the right end. In this case, the divided region 6011A is expanded in the horizontal direction, and the display of the divided region 6011A occupies substantially the entire detailed log information display region 601.

For example, when the divided region 6011A is expanded by a predetermined degree or more in the horizontal direction, the time axis can be further defined in the horizontal direction. For example, a time axis (referred to as a second time axis) obtained by developing, in the horizontal direction, a predetermined time range of the time axis in the vertical direction (referred to as a first time axis) is defined. With such a configuration, a plurality of pieces of second content of which time information is close to each other can be further developed in the horizontal direction.

That is, when the second content 6014 arranged in the divided region 6011A of FIG. 27A described above actually includes a plurality of pieces of second content $6014_1$ and $6014_2$ of which time information is close to each other, as exemplified in FIG. 29A, the pieces of second content $6014_1$ and $6014_2$ are developed and arranged in the horizontal direction corresponding to the time information in the divided region 6011A. Accordingly, the pieces of content of which time information is close to each other can be easily identified.

In FIG. 29A, by performing the tap operation on images of the pieces of second content $6014_1$ and $6014_2$, the pieces of second content $6014_1$ and $6014_2$ can be enlarged to be displayed. FIG. 29B illustrates an example in which the second content $6014_1$ in FIG. 29A is enlarged to be displayed. FIG. 29C illustrates an example in which the second content $6014_2$ in FIG. 29A is enlarged to be displayed.

For example, with reference to FIG. 29B, it is found that the divided region 6011A displays second content $6014_{1'}$ obtained by enlarging the second content $6014_1$. In this case, the reproduction controller 6012 is moved to a position indicating the time when the page operation information corresponding to the second content $6014_1$ is acquired, and the time is displayed on a reproduction time display 6013.

Also in FIG. 29C, the divided region 6011A displays second content $6014_{2'}$ obtained by enlarging the second content $6014_2$. Along therewith, the reproduction controller 6012 and the reproduction time display 6013 are changed to be the display corresponding to the time when the page operation information corresponding to the second content $6014_2$ is acquired.

The enlarged second content $6014_{1'}$ may be created in advance based on the image acquired from the paperless conference system 20, or may be generated in response to the tap operation on the second content $6014_1$.

Figure 30A:
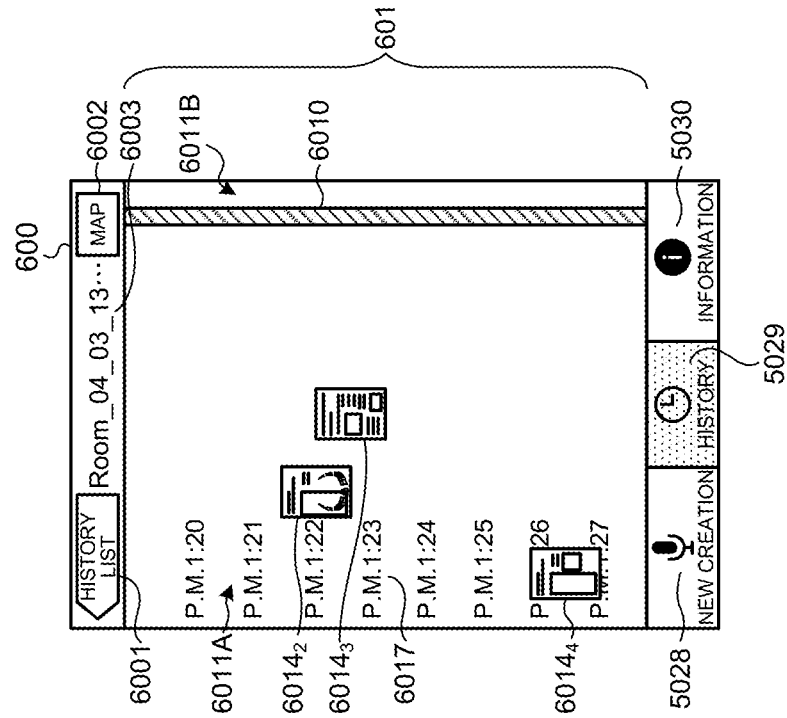
FIGS. 30A and 30B are diagrams for illustrating the log information browsing screen according to the first embodiment.
Figure 30B:
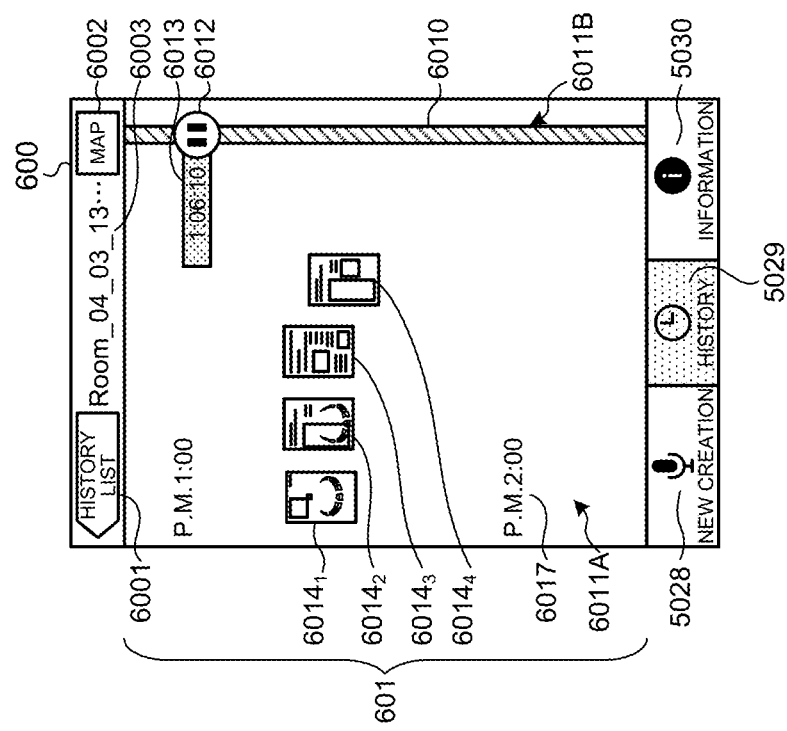

With reference to FIGS. 30A and 30B, the following describes a case in which the scale of the time axis is further enlarged in the vertical direction in the example of developing the time axis in the horizontal direction that is described with reference to FIG. 29A. For example, consideration is given to a case in which pieces of second content $6014_1$ to $6014_4$ of which page operation information is acquired at times close to each other are arranged in the divided region 6011A. In this case, when the scale of the time axis is small, the time axis is further developed in the horizontal direction, and the arrangement of the pieces of second content $6014_1$ to $6014_4$ is developed in the horizontal direction corresponding to the acquisition time of the page operation information, as exemplified in FIG. 30A.

FIG. 30B illustrates an example in which the pinch-out operation is performed on the state of FIG. 30A in the vertical direction to enlarge the scale of the time axis. In this case, as exemplified in FIG. 30B, the pieces of second content $6014_1$ to $6014_4$ that has been developed in the horizontal direction are rearranged according to the time axis in the vertical direction. In the example of FIG. 30B, the pieces of second content $6014_1$ to $6014_3$ of which acquisition time of the page operation information is close to each other are arranged being developed in the horizontal direction. On the other hand, the second content $6014_4$ of which acquisition time of the page operation information is away from those of the pieces of second content $6014_1$ to $6014_3$ is rearranged according to the time axis in the vertical direction. The second content $6014_1$ rearranged according to the time axis in the vertical direction extends off the detailed log information display region 601 upwardly (not illustrated).

When the time bar 6010 is moved to the left or the right, enlargement display or content display can be automatically performed for the first content or the second content corresponding to the designated time. By way of example, the following describes a case in which the time bar 6010 is moved to the right end as illustrated in FIGS. 31A and 31B. The time is assumed to be designated by using the reproduction controller 6012. The pieces of first content 6014$_1$ to 6014$_4$ illustrated in FIG. 30A are assumed to be arranged in the detailed log information display region 601.

In this case, when the swipe operation is performed on the reproduction controller 6012 on the time bar 6010, the second content related to the time corresponding to the position of the reproduction controller 6012 on the time bar 6010 is enlarged to be displayed. For example, as illustrated in FIG. 31A, when the reproduction controller 6012 is positioned at the time "1:21:47" on the time bar 6010, the first content 6014$_1$ corresponding to the time is enlarged and the enlarged first content 6014$_{1'}$ is displayed.

When the reproduction controller 6012 is further moved to a position indicating the time "1:25:24" on the time bar 6010 as exemplified in FIG. 31B, the first content 6014$_3$ corresponding to the time is enlarged and the enlarged first content 6014$_{3'}$ is displayed. The first content 6014$_{1'}$ is returned to the original first content 6014$_1$ of reduced size because the time indicated by the reproduction controller 6012 does not correspond thereto. The first content 6014$_1$ of the reduced size is hidden by the first content 6014$_3$ of enlarged size in FIG. 31B and not illustrated.

A map image can be displayed on the log information browsing screen 600. For example, when the log information includes the GPS trace table in FIG. 5B, the overall control unit 100 calls a map display application to display a map according to latitude and longitude information corresponding to the time designated on the time bar 6010. When the capture table in FIG. 5D or the memo table in FIG. 5F includes the latitude and longitude information, the overall control unit 100 calls the map display application to display the map according to the latitude and longitude information.

Figure 32B:
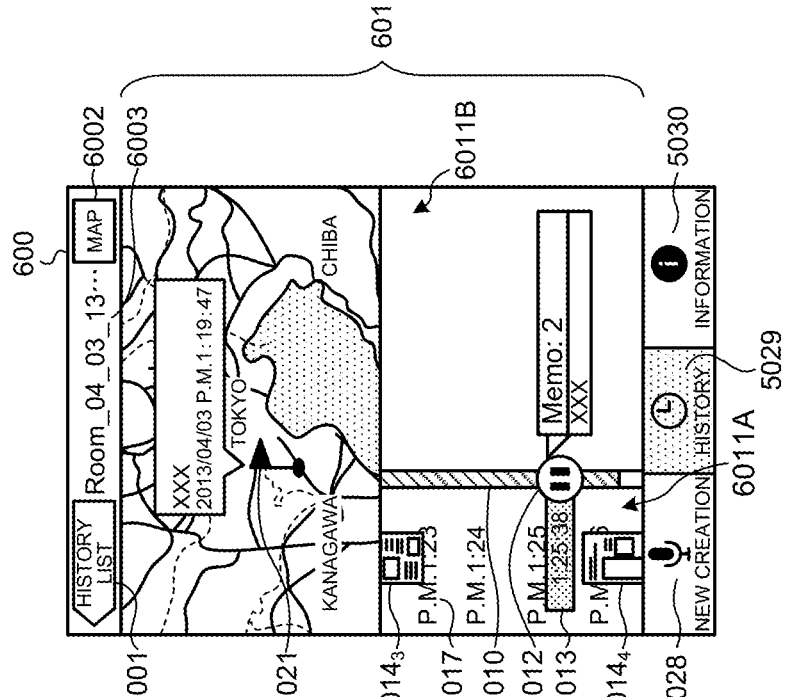
FIGS. 32A and 32B are diagrams for illustrating the log information browsing screen according to the first embodiment.
Figure 32A:
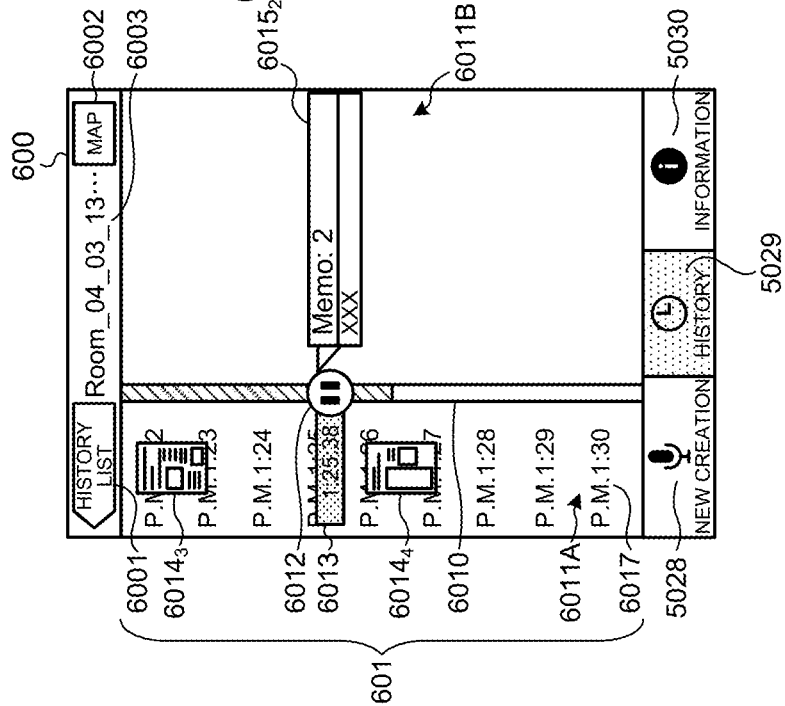

With reference to FIGS. 32A and 32B, the following describes the display of the map image in more detail. By way of example, the first content 6015$_2$ that is the memo data illustrated in FIG. 32A is assumed to have the latitude and longitude information. For example, the first content 6015$_2$ is selected by the tap operation on the first content 6015$_2$ or by moving the reproduction controller 6012 to a position corresponding to the time associated with the first content 6015$_2$.

When the tap operation is performed on the button 6002 in a state in which the first content 6015$_2$ is selected, the overall control unit 100 calls the map display application mounted on the multifunctional portable terminal 10. In this case, the overall control unit 100 refers to the memo table held in the table holding unit 108 and acquires the latitude and longitude information associated with the first content 6015$_2$ to transmit the information as a parameter to the map display application.

FIG. 32B illustrates an example in which the map display application displays a map corresponding to the first content 6015$_2$. A display region 6020 in the detailed log information display region 601 displays a map image including latitude and longitude indicated by the latitude and longitude information associated with the first content 6015$_2$. In the map image, an icon 6021 indicates a location corresponding to the latitude and the longitude. Attribute information of the first content 6015$_2$ (in this example, the title and the acquisition time) is displayed corresponding to the icon 6021.

In this way, the map image is displayed based on the log information, which enables the user to easily recall the situation in which the content is acquired.

Second Embodiment

Figure 33:
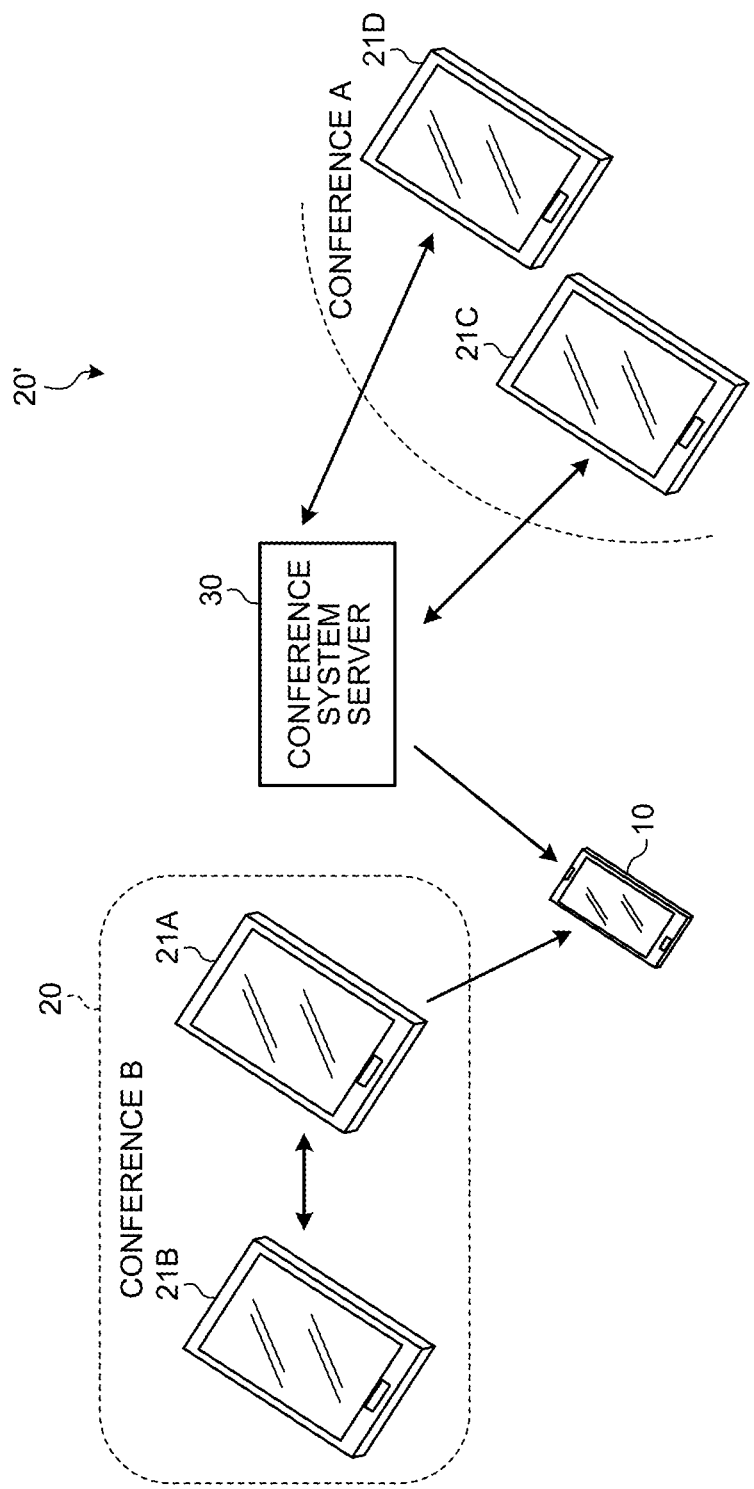
FIG. 33 is a diagram schematically illustrating an exemplary configuration of an information processing system according to a second embodiment.

Next, the following describes a second embodiment. FIG. 33 is a diagram schematically illustrating an exemplary configuration of the information processing system according to the second embodiment. The information processing system according to the second embodiment includes the multifunctional portable terminal 10 and a paperless conference system 20'. The paperless conference system 20' includes a conference system server 30, and one or more paperless conference system terminals 21C and 21D participating in a conference A share image data and operation information about the image data via the conference system server 30.

That is, the conference system server 30 preliminarily holds the image data to be shared between the paperless conference system terminals 21C and 21D. The image data may be transmitted from at least one of the paperless conference system terminals 21C and 21D participating in the conference A to the conference system server 30, and may be stored therein.

In the paperless conference system 20', the paperless conference system terminals 21C and 21D acquire the image data to be shared therebetween from the conference system server 30 when the conference A is started. For example, when a page operation is performed by the user, the paperless conference system terminal 21C changes a page of the image displayed by itself in response to the page operation, and transmits page operation information indicating the page operation to the paperless conference system terminal 21D via the conference system server 30. The paperless conference system terminal 21D changes a page of the image displayed by itself in response to the page operation information transmitted from the conference system server 30.

When cooperating with the paperless conference system 20', the multifunctional portable terminal 10 performs certain authentication processing with respect to the conference system server 30. If the authentication succeeds, the multifunctional portable terminal 10 acquires the image data shared between the paperless conference system terminals 21C and 21D from the conference system server 30. For example, when the page operation information is transmitted from the paperless conference system terminal 21C, the conference system server 30 transmits the page operation information to the multifunctional portable terminal 10. Accordingly, the multifunctional portable terminal 10 can share the image data and the page operation information with the paperless conference system 20'. The multifunctional portable terminal 10 can register the operation information acquired from the paperless conference system 20' to be included in the log information and associated with time information indicating the time when the information is acquired.

As described above, according to the second embodiment, the information processing system of the present invention can be applied to a paperless conference system sharing image data and operation information via a server.

In the second embodiment, because the functions of the multifunctional portable terminal 10 are the same as those in the first embodiment other than the cooperation with the paperless conference system 20', description thereof will not be repeated here. The multifunctional portable terminal 10 according to the second embodiment can also cooperate with the paperless conference system 20 not via a server as described in the first embodiment and illustrated as a conference B in FIG. 33.

Third Embodiment

Figure 34:
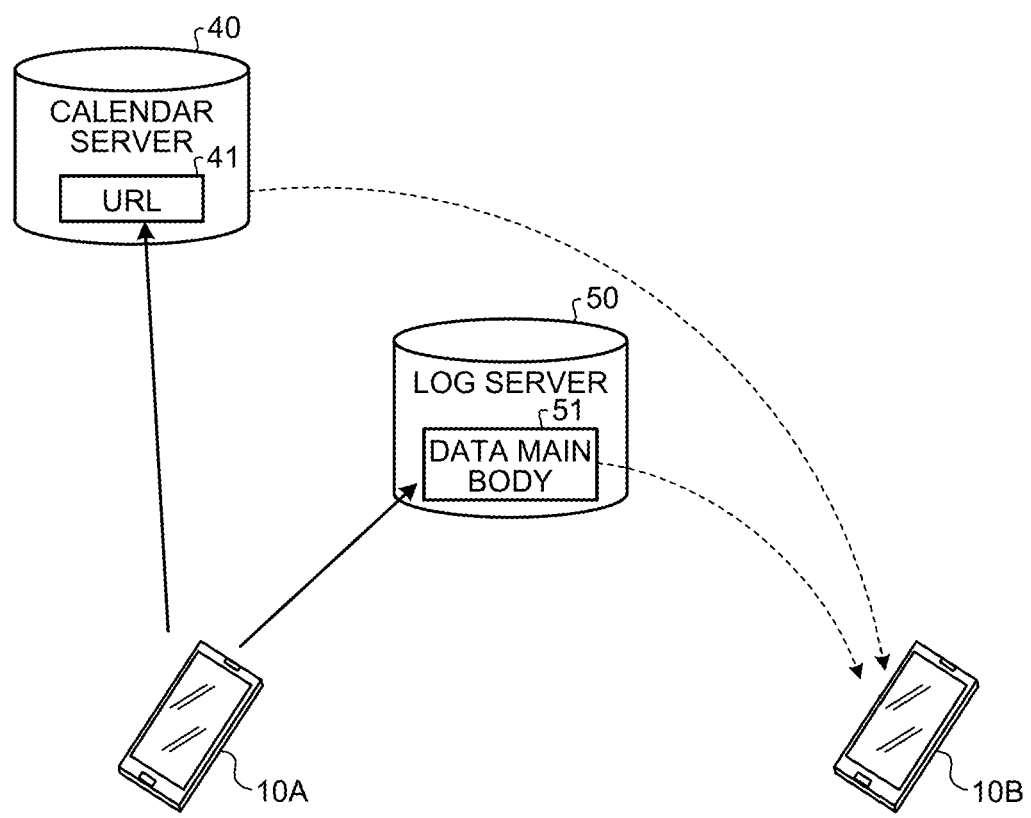
FIG. 34 is a diagram schematically illustrating an exemplary configuration of an information processing system according to a third embodiment.

Next, the following describes a third embodiment. FIG. 34 is a diagram schematically illustrating an exemplary configuration of the information processing system according to a third embodiment. In FIG. 34, the information processing system according to the third embodiment includes one or more multifunctional portable terminals 10A and 10B, a calendar server 40, and a log server 50. The calendar server 40 provides calendar service for managing event information and the like per user. The calendar server 40 provides, for example, the calendar service to a large number of unspecified users on a network. The calendar server 40 is not limited thereto, and may be a calendar server specific to the information processing system according to the third embodiment.

In the first embodiment and the second embodiment described above, the multifunctional portable terminal 10 registers the acquired log information in the local calendar mounted thereon. In contrast, in the third embodiment, the log information acquired by the multifunctional portable terminals 10A and 10B is registered in the calendar server 40 utilizing the calendar service provided by the calendar server 40.

The log server 50 stores a main body of the log information, that is, each of the tables illustrated in FIG. 4 and FIGS. 5A to 5C held in the table holding unit 108 in the first embodiment described above, and each piece of data such as the image data, the text data, and the voice data held in the data holding unit 109. FIG. 34 collectively illustrates the main body of the log information as a data main body 51.

In the calendar server 40, information indicating a position of the data main body 51 stored in the log server 50 on the network, such as a uniform resource locator (URL) 41 is registered as the log information.

That is, with reference to FIG. 21A, the screen 530 is displayed, for example, in the multifunctional portable terminal 10A in response to the tap operation on the button 5001 for designating check-in. When the button 5302 arranged in the display region 5301 is operated in the screen 530, the calendar service by the calendar server 40 can be selectable as the check-in destination in addition to the local calendar. If the calendar service is selected and the calendar service requires authentication processing, the display unit 406 displays an input screen for inputting a user ID or a password.

The authentication processing is also performed in the log server 50 to restrict the access of an arbitrary user. Herein, description will be made assuming that the user ID and the password can be used in common for the calendar server 40 and the log server 50.

The input of the user ID and the password is completed, and the input user ID and the password are transmitted from the multifunctional portable terminal 10A to the calendar server 40. The authentication processing is performed on the calendar server 40 based on the transmitted user ID and the password. If the authentication succeeds, the calendar server 40 notifies the multifunctional portable terminal 10A accordingly. In the same way, the authentication processing is performed on the log server 50. If the authentication succeeds, the log server 50 notifies the multifunctional portable terminal 10A accordingly.

In response to the notification of authentication success of the log server 50, the multifunctional portable terminal 10A transmits the main body of the log information to the log server. The main body of the log information is assigned a predetermined URL and stored in the log server 50 as the data main body 51. Further, in response to the notification of authentication success from the calendar server 40, the multifunctional portable terminal 10A transmits the log information to the calendar server 40. In this case, the multifunctional portable terminal 10A refers to the meeting list table held in the table holding unit 108, and associates, for example, the meeting ID with the URL 41 assigned to the main body of the log information to transmit them to the calendar server 40 as one event.

To browse the log information with the multifunctional portable terminal 10A, first, the tap operation is performed on the button 5029 serving as the history button similarly to the first embodiment. The multifunctional portable terminal 10A accesses the calendar service provided by the calendar server 40 in response to the tap operation, transmits the user ID or the password to be authenticated, and acquires a registered event. The multifunctional portable terminal 10A may also acquire an event registered in the local calendar.

The multifunctional portable terminal 10A causes the display unit 406 to display the screen 540 listing the pieces of event information acquired from the calendar service and the local calendar (refer to FIG. 22). When the event information acquired from the calendar service is selected from the list, the multifunctional portable terminal 10A acquires the URL assigned to the selected event information from the calendar server 40. The multifunctional portable terminal 10A then accesses the log server 50 according to the acquired URL to acquire the data main body 51, and causes the display unit 406 to display the log information browsing screen 600 based on the information included in the data main body 51.

According to the third embodiment, the multifunctional portable terminal 10A and the other multifunctional portable terminal 10B can easily share the log information. That is, regarding the log information registered by the multifunctional portable terminal 10A, the multifunctional portable terminal 10A and the other multifunctional portable terminal 10B (a user A of the multifunctional portable terminal 10A and a user B of the other multifunctional portable terminal 10B) preliminarily share the user ID and the password to be used for accessing the calendar server 40 and the log server 50. Accordingly, the user B can access the calendar server 40 to acquire the URL 41 using the multifunctional portable terminal 10B, and acquire the data main body 51 that is created by the user A and stored in the log server 50 using the acquired URL.

The user B can acquire the log information created by the user A without communicating with the multifunctional portable terminal 10A of the user A, and the user A and the user B can easily share the log information.

According to the present invention, information can be recorded and browsed in association with a time axis through cooperation with an external information presentation system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing device comprising:
a display panel;
a location sensor configured to determine geographical location information of the information processing device at a desired time interval;
a memory having computer readable instructions stored thereon; and
at least one processor configured to execute the computer readable instructions to,
display one or more operation screens on the display panel;
receive a first user's operation input into the operation screen;
communicate with at least one external device connected via a conference registered in a conference system;
acquire first content that is generated using the information processing device by the first user in response to the received first user's operation;
acquire second content from the at least one external device in response to a second user's operation received via the conference, the second content including image data of a page currently displayed on the at least one external device and user operation information related to the conference from the at least one external device;
store in the memory the first content and the second content in association with their respective acquisition times, the acquisition times including a time when the respective first content and the second content were acquired;
display a time axis, a first display region, and a second display region on the display panel, the first display region and the second display region not overlapping each other;
display the first content stored in the memory at a position on the time axis indicating the time associated with the first content in the first display region;
display the second content stored in the memory at a position on the time axis indicating the time associated with the second content in the second display region, the displaying the second content including displaying each page of the second content at a position on the time axis corresponding to the user operation information, the user operation information associated with each of the pages of the second content;
associate the geographical location information with a corresponding first content;
generate a map including the geographical information and information associated with the corresponding first content; and
display the generated map on the display panel in the first display region.

2. The information processing device according to claim 1, wherein the at least one processor is configured to change a ratio between a width of the first display region and a width of the second display region in response to a first user's operation input into the operation screen.

3. The information processing device according to claim 1, wherein the at least one processor is configured to:
acquire the second content that is image data configured of page units and including one or more pages; and
acquire, via the operation screen, page operation information indicating operation on the page performed on the external device by the second user, and
store in the memory time information related to a time when the page operation information is acquired in association with the second content.

4. The information processing device according to claim 3, wherein the user operation information includes operation information related to each of the pages of the second content.

5. The information processing device according to claim 1, wherein the at least one processor is configured to:
display on the display panel, in response to a first user's operation received using the operation screen, an input screen to prompt the first user to enter a pass code; and
store in the memory encrypted content obtained by encrypting at least the second content among the first content and the second content using the pass code.

6. The information processing device according to claim 1, wherein the at least one processor is further configured to:
perform communication via a network;
transmit, to a first server, the first content and the second content stored in the memory; and
transmit, to a second server, positional information indicating a position on the network of the first content and the second content transmitted to the first server in association with time information.

7. The information processing device according to claim 1, wherein the at least one processor is further configured to:
perform communication via a network; and
acquire the second content from a server connected to the external device via the network.

8. The information processing device according to claim 1, wherein the at least one processor is configured to change a scale of the time axis in response to a first user's operation on the time axis.

9. The information processing device according to claim 1, wherein the at least one processor is further configured to:
acquire voice data; and
store in the memory the acquired voice data in association with an acquisition start time and an acquisition end time.

10. A display control method performed by an information processing device including a display panel, the method comprising:
  obtaining, using at least one processor, geographical location information at a desired time interval from a location sensor;
  displaying, using the at least one processor, one or more operation screens on the display panel;
  receiving, using the at least one processor, a first user's operation input into the operation screen;
  communicating, using the at least one processor, with at least one external device connected via a conference registered in a conference system;
  acquiring, using the at least one processor, first content that is generated using the information processing device by the first user in response to the received first user's operation;
  acquiring, using the at least one processor, second content that is received from the at least one external device in response to a second user's operation received via the conference, the second content including image data of a page currently displayed on the at least one external device and user operation information related to the conference from the at least one external device;
  storing, using the at least one processor, in a memory of the information processing device, the first content and the second content in association with their respective acquisition times, the acquisition times including a time when the first content and the second content were acquired;
  displaying, using the at least one processor, a time axis, a first display region, and a second display region on the display panel, the first display region and the second display region not overlapping each other;
  displaying, using the at least one processor, the first content stored in the memory at a position on the time axis indicating the time associated with the first content in the first display region;
  displaying, using the at least one processor, the second content stored in the memory at a position on the time axis indicating the time associated with the second content in the second display region, the displaying the second content including displaying each page of the second content at a position on the time axis corresponding to the user operation information, the user operation information associated with each of the pages of the second content;
  associating, using the at least one processor, the geographical location information with a corresponding first content;
  generating, using the at least one processor, a map including the geographical information and information associated with the corresponding first content; and
  displaying, using the at least one processor, the generated map on the display panel in the first display region.

11. The display control method according to claim 10, wherein the receiving the first user's operation includes:
  changing a ratio between a width of the first display region and a width of the second display region in response to the received first user's operation; and
  displaying the first display region and the second display region on the display panel.

12. The display control method according to claim 10, wherein
  the acquiring of the second content includes acquiring the second content that is image data configured of page units and including one or more pages, and
  acquiring, via the operation screen, page operation information indicating operation on the page performed on the external device by the second user, and
  the storing includes storing, in the memory, time information related to a time when the page operation information is acquired in association with the second content.

13. The display control method according to claim 12, wherein the user operation information includes page operation information related to each of the pages of the second content.

14. The display control method according to claim 10, further comprising:
  displaying on the display panel, in response to a first user's operation received using the operation screen, an input screen to prompt the first user to enter a pass code; and
  storing in the memory, encrypted content obtained by encrypting at least the second content among the first content and the second content using the pass code.

15. The display control method according to claim 10, further comprising performing network communication via a network, wherein
  the performing of the network communication includes transmitting, to a first server, the first content and the second content stored in the memory, and
  transmitting, to a second server, positional information indicating a position on the network of the first content and the second content transmitted to the first server in association with time information.

16. The display control method according to claim 10, further comprising performing network communication via a network, wherein
  the acquiring of the second content includes acquiring the second content from a server connected to the external device via the network.

17. The display control method according to claim 10, the method further comprising:
  changing, using the at least one processor, a scale of the time axis in response to a first user's operation on the time axis.

18. The display control method according to claim 10, further comprising:
  acquiring, using the at least one processor, voice data, wherein
  the storing includes storing, in the memory, the acquired voice data in association with an acquisition start time and an acquisition end time.

* * * * *